(12) United States Patent
Culter

(10) Patent No.: US 8,914,606 B2
(45) Date of Patent: Dec. 16, 2014

(54) SYSTEM AND METHOD FOR SOFT PARTITIONING A COMPUTER SYSTEM

(75) Inventor: Bradley G. Culter, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2434 days.

(21) Appl. No.: 11/038,379

(22) Filed: Jan. 20, 2005

(65) Prior Publication Data

US 2006/0010450 A1 Jan. 12, 2006

Related U.S. Application Data

(60) Provisional application No. 60/586,201, filed on Jul. 8, 2004.

(51) Int. Cl.
*G06F 12/00* (2006.01)
*G06F 9/50* (2006.01)

(52) U.S. Cl.
CPC .................................. *G06F 9/5077* (2013.01)
USPC ............ 711/173; 711/E12.078; 711/E12.005; 718/104

(58) Field of Classification Search
None
See application file for complete search history.

(56) References Cited

U.S. PATENT DOCUMENTS

| | | | |
|---|---|---|---|
| 6,081,879 A | 6/2000 | Arnott | |
| 6,247,109 B1 | 6/2001 | Kleinsorge et al. | |
| 6,314,501 B1 * | 11/2001 | Gulick et al. | 711/153 |
| 6,332,180 B1 | 12/2001 | Kauffman et al. | |
| 6,360,303 B1 * | 3/2002 | Wisler et al. | 711/152 |
| 6,381,682 B2 * | 4/2002 | Noel et al. | 711/153 |
| 6,385,721 B1 | 5/2002 | Puckette | |
| 6,473,655 B1 | 10/2002 | Gould et al. | |
| 6,542,926 B2 * | 4/2003 | Zalewski et al. | 709/213 |
| 6,681,282 B1 * | 1/2004 | Golden et al. | 710/302 |
| 6,715,031 B2 * | 3/2004 | Camble et al. | 711/111 |
| 6,763,458 B1 | 7/2004 | Watanabe | |
| 6,901,534 B2 | 5/2005 | Carr | |
| 2002/0184445 A1 * | 12/2002 | Cherabuddi | 711/130 |
| 2003/0012114 A1 | 1/2003 | Larvoire | |
| 2003/0037178 A1 * | 2/2003 | Vessey et al. | 709/319 |
| 2003/0115443 A1 * | 6/2003 | Cepulis et al. | 713/2 |
| 2003/0229721 A1 * | 12/2003 | Bonola et al. | 709/253 |
| 2003/0229774 A1 * | 12/2003 | Freeman et al. | 713/1 |
| 2004/0049669 A1 * | 3/2004 | Schelling et al. | 713/2 |

(Continued)

FOREIGN PATENT DOCUMENTS

| | | |
|---|---|---|
| JP | 2002-215408 | 8/2002 |
| JP | 2004-070935 | 3/2004 |
| WO | WO 02/03220 A2 | 1/2002 |

OTHER PUBLICATIONS

Examiner's Answer dated Jan. 21, 2009 for U.S. Appl. No. 11/085,757 in the United States.

(Continued)

*Primary Examiner* — Edward Dudek, Jr.
*Assistant Examiner* — Christopher Birkhimer
(74) *Attorney, Agent, or Firm* — Fulbright & Jaworski, LLP; Jody C. Bishop

(57) ABSTRACT

According to at least one embodiment, a method comprises partitioning a computer system into a plurality of soft partitions that each run an operating system. The method further comprises instantiating a separate firmware instance for each of the plurality of soft partitions, wherein each of the firmware instances provides a pre-defined firmware interface for the operating system of its respective soft partition.

29 Claims, 8 Drawing Sheets

(56) References Cited

U.S. PATENT DOCUMENTS

| | | |
|---|---|---|
| 2004/0123092 A1 | 6/2004 | Cepulis |
| 2004/0243534 A1 | 12/2004 | Culter et al. |
| 2004/0268295 A1 | 12/2004 | Culter |
| 2005/0108456 A1 | 5/2005 | Boutcher |
| 2005/0246505 A1 | 11/2005 | McKenney |
| 2006/0010450 A1 | 1/2006 | Culter |

OTHER PUBLICATIONS

Final Office Action dated Jul. 2, 2008 for U.S. Appl. No. 11/085,757 in the United States.

Office Action dated Nov. 15, 2007 for U.S. Appl. No. 11/085,757 in the United States.

Haff, G., "The Partitioning Bazaar: 2002" Illuminata, Inc., 7 pages.

Haff, G., "Walling Off Workloads with Partitions", Jun. 18, 2002, Illuminata, Inc., 6 pages.

Hewlett-Packard, "hp-ux virtual partitions-product brief", 4 pages, 2001.

U.S. Appl. No. 60/586,201, Culter.

Hewlett-Packard White Paper, hp-ux virtual partitions (vPars),—Jan. 31, 2003, 20 pages.

Hewlett-Packard White Paper, "hp partitioning continuum", Jun. 2002, 43 pages.

Hewlett-Packard White Paper, "partitioning-usage in the real world with superdome and the rp8400", Feb. 2002, 42 pages.

Hewlett-Packard, Installing and Managing HP-UX Virtual Partitions (vPars), Nov. 2001, 136 pages.

Intel Itanium Architecture Software Developer's Manual, vol. 2: System Architecture, Rev. 2.0, Dec. 2001, 28 pages.

* cited by examiner

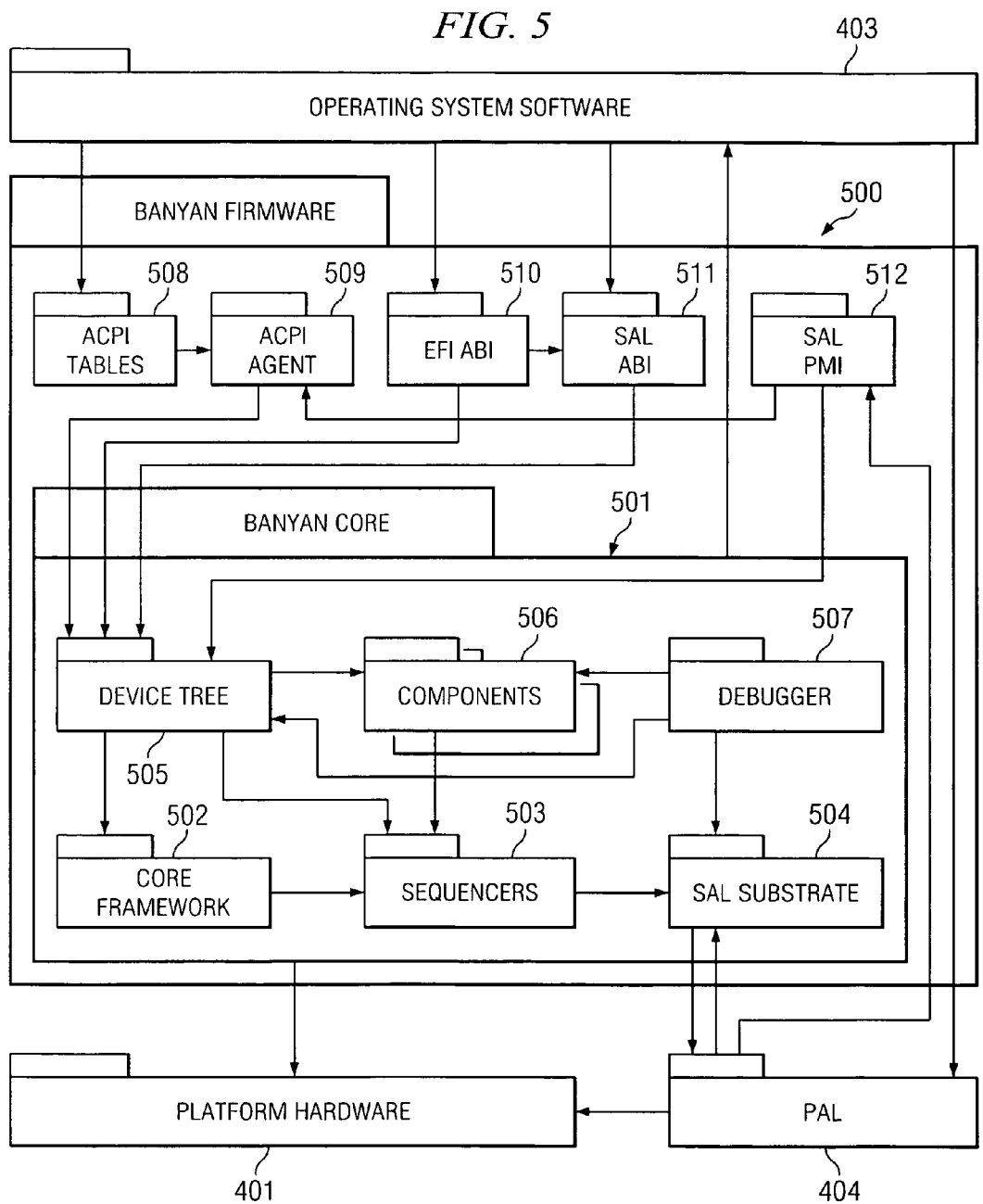

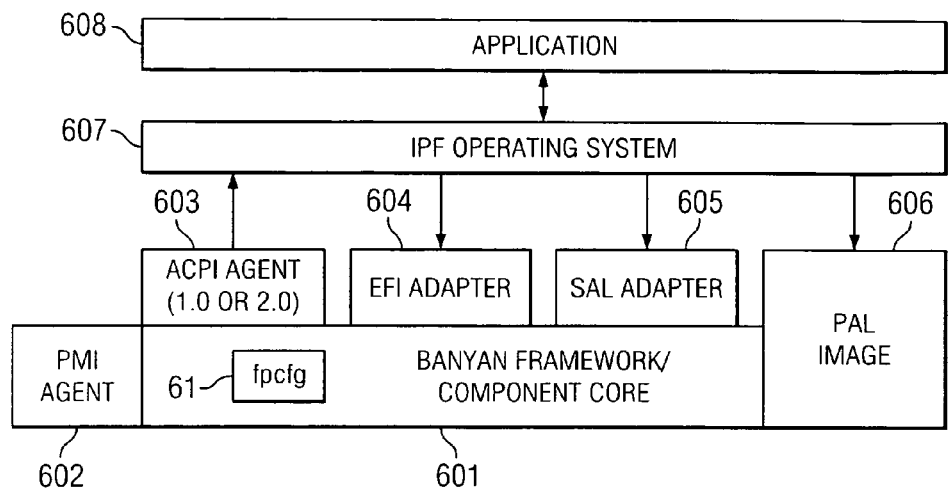
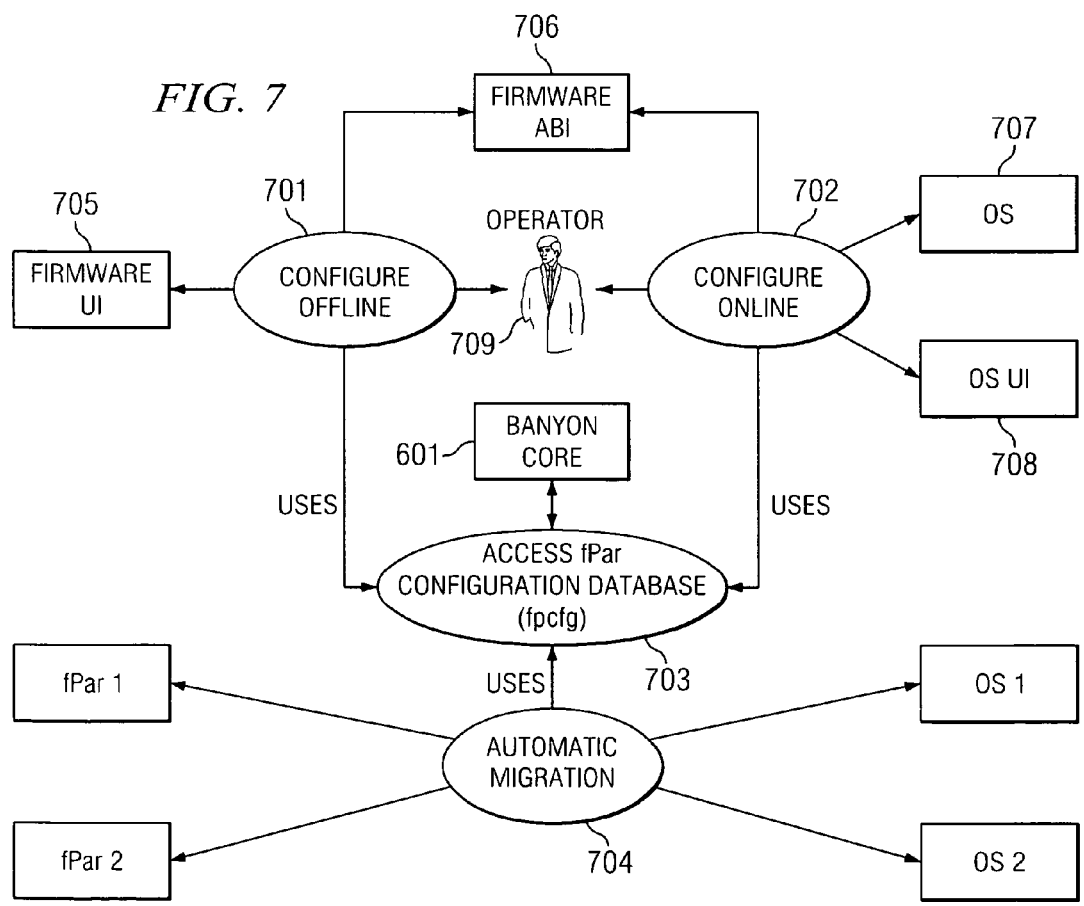

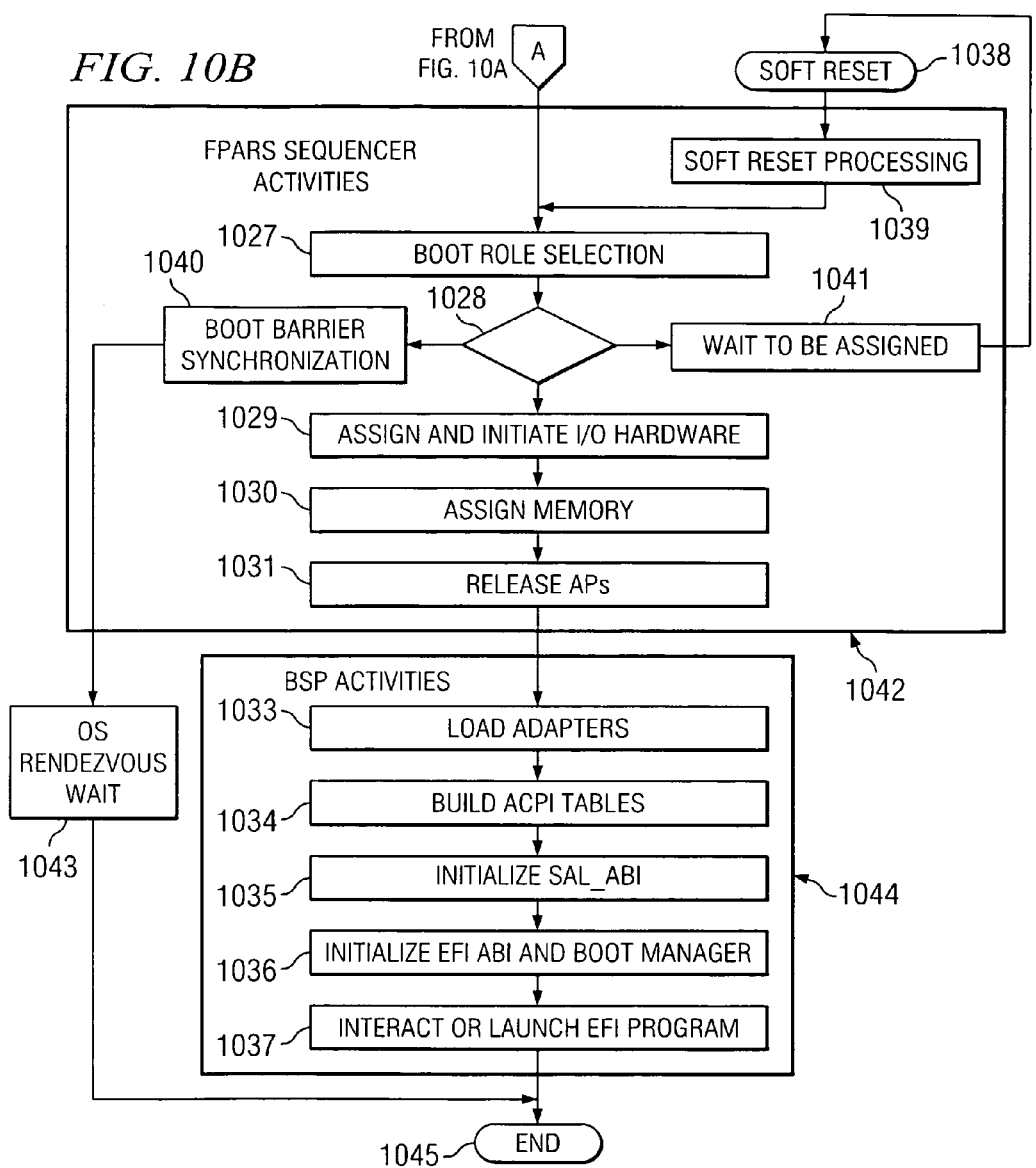
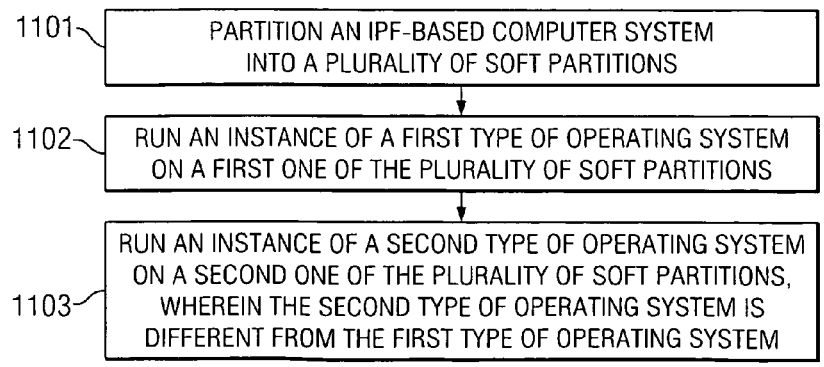

SYSTEM AND METHOD FOR SOFT PARTITIONING A COMPUTER SYSTEM

RELATED APPLICATIONS

This application claims priority to U.S. Provisional Patent Application Ser. No. 60/586,201 entitled "System and Method for Soft Partitioning a Computer System", filed Jul. 8, 2004, the disclosure of which is hereby incorporated herein by reference.

BACKGROUND

Prior computer platforms have been symmetric multi-processor (SMP) arrangements where multiple central processing units (CPUs) run a single copy of the operating system (OS). The OS provides time sharing services to allow multiple applications to run. However, this arrangement permits the applications to interfere with each other. For example, if the system is running an accounting application, the accounting application can allocate all the memory in the system, as well as use all the processors that the OS can allocate. Then, when some other application needs processors or memory, for example a manufacturing application, it would not be able to allocate any memory or processors for its needs, and therefore would freeze. Thus, the manufacturing application may be frozen or impacted by the accounting application. This arrangement also leaves the system vulnerable to failures. Any problem with one application could corrupt the resources for all applications.

A known solution to this problem is to separate the computer system into partitions or protected domains. Depending on the type of partitioning implemented, a computer system's resources may be effectively placed into separate functional blocks wherein resources in one block do not have direct access to resources in another block. As described further below, certain types of partitioning may completely isolate resources in each partition such that an application operating in one partition has no access to resources in another partition. Other types of partitioning may be less restrictive such that certain resources may be shared across a plurality of different partitions. In general, partitioning computer resources may effectively prevent one application from using the entire system resources, as well as contain faults and errors that may arise within a partition. Partitions thus allow multiple OSs and applications to coexist on a single box (or set of computer resources) and be reliably protected from each other's failures and, for the most part, use of system resources.

Partitioning techniques range from those deeply rooted in the system's physical hardware to others that are entirely software based. One type of partitioning is known as "hard partitioning" (or "physical partitioning") which is a physical partition of a computer that divides the computer into groups of cell boards where each group operates independently of other groups. Various different cellular systems are available that provide cells that are physically partitioned from each other, including as an example the server available from Hewlett-Packard Company commercially known as 9000 Superdome. Generally, physical (or hard) partitions rely on the structure of the underlying system hardware and components, such as processor and memory modules, and partition boundaries are enforced by system electronics, such as crossbar switches.

Various hard partitioning solutions are available in the existing art for providing complete hardware and electrical isolation between different partitions, including a solution commercially known as "nPartitions," which is available from Hewlett-Packard Company. The nPartition solution enables a single server complex, such as Hewlett-Packard Company's 9000 Superdome server, to be configured as one large system or as multiple smaller systems. These hard partitions are designed to provide for complete electrical and software isolation. For organizations where high availability is critical, hard partitioning ensures that any fault within one partition cannot impact any other partition. Applications running within hard partitions are not subject to hardware or software events in other partitions.

Each nPartition has one or more cells (containing processors and memory) that are assigned to the partition for its exclusive use. Any input/output ("I/O") chassis that is attached to a cell belonging to a partition also is assigned to the partition. Generally, each chassis has Peripheral Component Interconnect ("PCI") card slots plus any I/O cards and attached devices, and may also have core I/O. Since each nPartition has its own Central Processing Unit ("CPU"), memory, and I/O resources consisting of the resources of the cells allocated to the nPartition, resources may be removed from one nPartition and added to another without having to physically remove and add hardware (e.g., by re-defining the resources (cells) allocated to each nPartition). Additionally, dynamic creation and modification of nPartitions is supported. Each nPartition operates in such a manner that it can be totally isolated from other hard partitions. Each nPartition executes a single OS image (or instance), thus providing software isolation. Alternate nPartitions may, therefore, be executing different versions of the OS. Further, different types of OSs, such as HP-UX™, LINUX, and Microsoft WINDOWS™, may be executing in different nPartitions.

In view of the above, through hard partitioning, applications and operating environments execute in system partitions that are electrically isolated and protected from one another by hardware separation. As such, hardware failures are confined to the partition in which they occur. Moreover, the majority of hardware upgrades require that only the affected partitions be brought down, not the entire system. The reconfiguration or rebooting of an individual hard partition does not require a reboot of the entire system. Thus, the hard partitioning approach has the advantage of being able to isolate many hardware failures in addition to software problems. However, it is only as granular as the modules on which it is based. Many hard partition solutions do not allow for partitions to be formed with modules that have less than four (4) processors and a gigabyte or more of memory. Thus, the flexibility of configuring hard partitions is often limited. To obtain finer granularity, a hard partition can be further divided into "soft partitions" or "virtual partitions," which are described further below.

Another type of partitioning is known as "soft partitioning" (sometimes referred to as "logical partitioning"), which enables multiple instances of an OS to run simultaneously on one computer by dividing the computer into soft partitions. In soft partitioning, software is used to configure and supervise various partitions. Thus, rather than partitioning resources through physical partitioning (e.g., in which the hardware enforces the partitions), a software supervisory layer may be implemented to define partitions and assign the system's resources that are to be reserved for each partition as well as any resources that are to be shared between the partitions. Through the software configuration, each soft partition may be assigned its own subset of hardware, runs a separate instance of the OS, and hosts its own set of applications. However, soft partitioning does not provide complete physical and electrical isolation. Rather, depending on the configuration of the soft partitions, certain system resources, such as memory, may be shared across various different soft partitions.

Thus, soft partitioning provides much greater flexibility than hard partitions with respect to the configuration of partitions. For instance, the granularity achievable for each soft partition is not based on the hardware modules of a system, as in traditional hard partitioning techniques. Accordingly, finer granularity of partitions may be achieved through soft partitioning. However, the soft partitioning approach is not fully isolated in the manner that hard partitions are, such that many hardware failures may effect multiple soft partitions. An example of a soft partitioning technique is described further in U.S. Pat. No. 6,381,682 titled "METHOD AND APPARATUS FOR DYNAMICALLY SHARING MEMORY IN A MULTIPROCESSOR SYSTEM" and U.S. Pat. No. 6,542,926 titled "SOFTWARE-PARTITIONED MULTI-PROCESSOR SYSTEM WITH FLEXIBLE RESOURCE SHARING LEVELS," the disclosures of which are hereby incorporated herein by reference.

Another type of partitioning is known as "virtual partitioning." Virtual partitions (also known as "virtual machines") may be used to carve up a system's hardware into just about any possible combination, including parts of a CPU, network card, or storage adapter, without regard for any boundaries or physical relationships of the underlying hardware. True virtual machine technology provides OS-agnostic mechanisms based low-level processor virtualization.

An example of a partitioning technique that combines both hard and soft partitioning is known as "vPars" which is available from Hewlett-Packard Company for the HP-UX™ OS. VPars enables a computer to be partitioned into so-called virtual partitions (which are actually "soft partitions" as used herein, rather than fully virtual partitions formed with virtual machine technology) that each runs a separate, isolated instance of HP-UX™. VPars for HP-UX™ is described further in "Installing and Managing HP-UX Virtual Partitions (vPars)," First Edition, November 2001, T1335-90001 (vPars version B.01.00 on HP-UX), the disclosure of which is hereby incorporated herein by reference.

Thus, HP-UX vPars enables multiple instances (versions) of the HP-UX 11i Operating Environment (OE) to run simultaneously on one server with each OE instance hosting its own set of applications in a fully isolated environment. Created through software, these soft partitions provide isolation between application and OSs on single server nodes or within single-system hard partitions. Each vPar partition runs its own image (or instance) of the OS and can fully host its own applications, thus offering complete software isolation. The capability of CPU migration allows users to add and delete dynamically (without reboot) CPUs from one vPar partition to another. This enables applications to coexist in the same server while assuring complete privacy. In addition, functionality is provided to dynamically create, modify, or even delete the isolated operating environments on a running server without interrupting non-related partitions.

In comparison to nPartitions, vPars provides greater flexibility and granularity while nPartitions provides greater fault isolation. Greater flexibility in vPars is achieved with the ability, through use of simple software commands, to add and delete dynamically (without reboot) CPUs from one vPar partition to another. In addition, multiple vPar partitions can function within an nPartition, thus providing greater granularity (e.g., 1 CPU per vPar partition).

SUMMARY

According to at least one embodiment, a method comprises partitioning a computer system into a plurality of soft partitions that each run an operating system. The method further comprises instantiating a separate firmware instance for each of the plurality of soft partitions, wherein each of the firmware instances provides a pre-defined firmware interface for the operating system of its respective soft partition.

According to at least one embodiment, a system comprises a plurality of soft partitions each running an operating system. The system further comprises a firmware instance for each of the plurality of soft partitions, each of the firmware instances providing a standard firmware interface for the operating system of its respective soft partition.

According to at least one embodiment, a system comprises means for defining a plurality of soft partitions each running an operating system. The system further comprises means for providing a firmware instance for each of the plurality of soft partitions, the firmware instance providing a pre-defined firmware interface for the OS of each soft partition.

According to at least one embodiment, a method comprises partitioning an IPF-based computer system into a plurality of soft partitions. The method further comprises running an instance of a first type of operating system on a first one of the plurality of soft partitions, and running an instance of a second type of operating system on a second one of the plurality of soft partitions, wherein the second type of operating system is different from the first type of operating system.

BRIEF DESCRIPTION OF THE DRAWINGS

FIG. 5 shows an example firmware architecture that is implemented for the IA-64 architecture of FIG. 4 in accordance with one embodiment of the fPars partitioning technique, referred to herein as the Banyan architecture;

FIG. 6 shows a high-level diagram of the example Banyan software stack implemented within a hard partition in accordance with a preferred embodiment;

FIG. 7 shows four example use cases involving the fPars configuration database of one embodiment for configuring/re-configuring a soft partition;

FIGS. 10A-10B shows an operational flow diagram of one embodiment of the fPars soft partitioning technique, which illustrates the differences between a traditional nPartition boot and this example fPar boot sequence; and FIG. 11 shows an example operational flow diagram for running instances of different types of OSs on different soft partitions of an IPF-based computer system in accordance with one embodiment.

DETAILED DESCRIPTION

Figure 1:
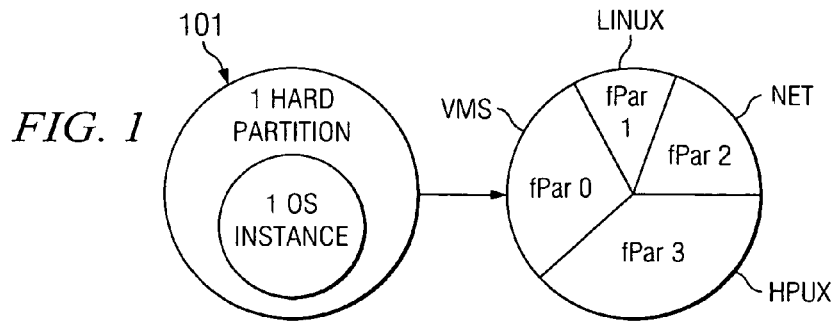
FIG. 1 shows an example of soft partitioning enabled by an embodiment of a soft partitioning technique described herein.

Embodiments of a novel soft partitioning system and method are now described with reference to the above figures.

As mentioned above, partitioning the resources of a computer system into a plurality of hard, soft, and/or virtual partitions is often desirable. Embodiments of soft partitioning described herein provide a technique, referred to herein as "fPars," that is compatible with industry standard firmware interfaces, such as the industry standard firmware interfaces for Intel Processor Family ("IPF") processors. In accordance with one embodiment, a system comprises a plurality of soft partitions that each run an instance of an OS. A firmware instance exists for each of the plurality of soft partitions, wherein each firmware instance provides a standard IPF firmware interface for the OS of its respective soft partition. Such a standard IPF firmware interface may, as examples, comprise an ACPI interface, EFI interface, SAL interface, and PAL interface, as described further below. Further, such standard IPF firmware interface may comprise extension mechanisms to the above-mentioned interfaces. For instance, an OEM Runtime EFI Protocol extension to the EFI interface may be included, as defined by Intel in their standard specification for EFI, and an OEM Extensible SAL Interface Table may be included, as defined by DIG64 (an industry standards body dealing with IPF systems). The system also includes a configuration database specifying resources assigned to each of the plurality of soft partitions.

The IPF standards that a hardware platform is to provide are very extensive, and thus constrain all system designs quite rigorously. The IPF standards assume there is no soft-partitioning of an IPF computer (i.e., the assumption is that the computer is one hardware system running one OS instance). Certain embodiments of soft partitioning described herein enable the introduction of soft-partitioning functionality into an IPF-based system without changing or violating the IPF interface constraints. Prior soft partitioning techniques have been implemented through modifications of the OS and/or the hardware (e.g., as Hewlett-Packard Company did with PA-RISC and Compaq did with Alpha and VMS). That is, soft-partitioning techniques have traditionally been implemented by those having control over the OS and/or the hardware, whereby such OS and/or hardware are changed (e.g., the interfaces therebetween may be changed) to enable soft-partitioning. Embodiments of soft partitioning described herein provide a technique for achieving soft partitioning of a system using the existing OS (or a slightly modified version thereof) and existing firmware architecture. More specifically, compatibility with standard firmware interfaces is maintained, while soft-partitioning of a system is achieved. A specific example implementation is described herein for an IPF-based system in which the standard IPF firmware interfaces are maintained within the soft-partitioning solution such that the OS(s) and underlying hardware (e.g., IPF processors) are not required to be modified (or are modified only slightly). Thus, rather than developing a new firmware interface to be utilized by an OS for enabling soft partitioning of a system, pre-defined (e.g., industry standard) firmware interfaces, such as the industry standard IPF firmware interfaces, are maintained in the soft partitioning. Thus, OSs that are compatible with such pre-defined firmware interfaces remain compatible therewith, while soft partitioning is also enabled. Thus, for instance, as described further below, an IPF-compatible OS instance running on a soft partition remains compatible with the pre-defined, industry standard IPF firmware interfaces. As detailed further below, in certain embodiments, a separate firmware instance exists for each soft partition of the system, wherein each firmware instance provides a standard IPF firmware interface for the OS of its respective soft partition.

It will be recognized that embodiments of soft partitioning described herein may be applied not only for IPF-based systems, as in the specific example described further herein, but may similarly be applied for enabling soft partitioning of other types of systems in a manner that enables the pre-defined interfaces between an OS and the system firmware to be maintained such that the OS and/or underlying hardware need not be modified (or modifications thereto may be minimized) for achieving such soft partitioning.

Accordingly, certain embodiments described herein enable soft partitioning to be achieved in a manner such that each soft partition is compatible with industry standard firmware interfaces, which provides several advantages and benefits. By enabling soft partitioning to be achieved in a manner that is compatible with industry standard firmware interfaces, any OS and hardware that is compatible with such industry standard firmware interfaces may be implemented in each soft partition. That is, the OS and hardware need not be modified in order to enable soft partitioning. For example, proprietary interfaces need not be implemented in the OS and/or the hardware in order to achieve support for soft partitioning. Rather, firmware may be used, as described further below, to allow for soft partitioning without requiring that the industry standard interfaces for the OS(s) and hardware be modified. Further, any OS that is compatible with the industry standard firmware interfaces may be run in each soft partition. For instance, an example embodiment is implemented for achieving soft partitions that each support IPF standard firmware interfaces, in which case any IPF OS may be run in each soft partition. Soft partitioning solutions for IPF-based systems are not available in the prior art. Further, soft partitioning solutions that enable soft partitions to be created that are each compatible with IPF standard firmware interfaces are not available in the prior art. Thus, certain embodiments are advantageous in that they enable soft partitioning of IPF-based systems. Again, while specific examples are discussed herein with reference to IPF interfaces, the techniques described herein may be readily adapted for application in providing soft partitioning solutions that are compatible with any pre-defined hardware interfaces, and thus embodiments described herein are not intended to be limited to IPF-based systems.

Further, in accordance with certain embodiments, different OSs may be run on different soft partitions of a computer system. For instance, in accordance with one embodiment, a computer system may be partitioned into a plurality of soft partitions and an instance of a first type of OS may run on a first one of the plurality of soft partitions, and an instance of a different type of OS may run on a second one of the plurality of soft partitions. In certain embodiments, each soft partition may be compatible with IPF standard firmware interfaces such that each soft partition may have an instance of any standard IPF OS running thereon, including as examples: IPF LINUX, WINDOWS, Open VMS, and IPF HP-UX.

As described further below, certain embodiments enable use of standard IPF firmware interfaces (e.g., ACPI and SAL interfaces) that exist for "hot plug" (online addition or removal of hardware) to provide "device migration" between sibling soft partitions. Thus, the soft partitioning technique of certain embodiments enables resources to dynamically migrate (e.g., for load balancing, etc.) between sibling soft partitions (e.g., soft partitions configured on a common hard partition) within an IPF-based system using standard IPF firmware interfaces.

Additionally, such "hot plug" firmware interfaces may be utilized to migrate resources from a soft partition of one hard partition to a soft partition of a different hard partition. For instance, in certain embodiments the fPars "spanning namespace" may include resources (e.g., hardware devices)

that do not belong to an OS of a given soft partition, and the OS avoids trying to use those resources that do not belong to it (e.g., because the OS's_STA methods declare those devices to be disabled). In certain embodiments, not only may all of the resources of one hard partition be included in this spanning namespace, but all of the resources of a plurality of different hard partitions may be so included. The standard firmware interfaces for performing hot plug may then be used for removing a resource (e.g., hardware device) from a soft partition of a first hard partition and adding such resource to a soft partition of a second hard partition. For instance, a configuration database (referred to herein as "fpcfg") may be modified to reflect that the resource is no longer assigned to the soft partition of the first hard partition and is now assigned to the soft partition of the second hard partition.

As mentioned above, an example of a hybrid partitioning technique of the existing art includes vPars for HP-UX available from Hewlett-Packard Company. In general, vPars allows the PA-RISC hardware and firmware to be partitioned into n vPar partitions. For instance, each partition may include its own boot disk, its own CPU(s), its own network connection (e.g., LAN and/or WAN connection), and a sufficient subset of memory to run HP-UX and the applications intended to be hosted on that vPar partition. The vPars monitor, in collaboration with system management applications under control of an operator, manages the assignment of hardware resources to the partitions, boots the partitions and their kernels, and emulates certain firmware calls. By emulating these specific calls, vPars creates the illusion to each HP-UX instance that it is running on a standalone computer having the hardware that has been assigned to it. At the heart of the vPars monitor is a "partition database." The partition database contains partition configuration information. Using the partition database, the vPars monitor tracks which partitions exist and what hardware resources and partition attributes are associated with each partition.

The HP-UX PA-RISC vPars implementation is a "hybrid" solution whereby the vPars monitor, by emulation of PA firmware interfaces, provides a "soft partitioned" framework in which itself and other vPars-aware modules inside the HP-UX OS itself collaborate to provide a "virtual partitioning" user-experience. More specifically, vPars uses virtual memory mechanisms to increase protection between soft partitions. Because a particular virtual memory design within an OS is usually (preferably) very OS specific, the implementation of vPar partitions using different OSs (e.g., HP-UX, LINUX, WINDOWS, and Open VMS) within the soft partitions is pragmatically impossible in such an implementation. So, the beneficial effect of vPars in using virtual memory mechanisms to increase protection between soft partitions is that better isolation among the soft partitions exists, as compared with typical soft partitioning solutions. But, a disadvantage of this solution is that mixing different types of OSs within the partitions of a system is effectively impossible.

The vPars design works well for PA-RISC based solutions, for example. That is, vPars works well for partitioning a computer system having processors from Hewlett-Packard Company's PA-RISC family of processors (such as PA-8000, PA-8200, or PA-8500 processors) to enable multiple, isolated instances of HP-UX to run on the computer system. However, a disadvantage of the vPars design is that it does not work for INTEL™ Processor Family ("IPF") servers employing standard IPF firmware interfaces. Various other soft partitioning solutions may be available in the art, but such soft partitioning solutions are not compatible with industry standard firmware interfaces (such as the well-known ACPI, SAL, EFI, and PAL interfaces of IPF) to enable such partitioning to work with any standard IPF OS without changing the OS.

As mentioned above, soft partitioning techniques for IPF-based servers to provide soft partitioning of system resources whereby multiple OS instances can share separate parts of a single SMP server do not exist in the prior art. That is, a soft partitioning technique that is compatible with industry standard IPF firmware interfaces is not available in the prior art. For instance, as described above, the vPars design does not work for IPF servers employing standard IPF firmware interfaces. This consequence is primarily due to the fact that IPF firmware may be called in virtual mode using virtual address mappings that are created and defined by the OS image such that the firmware resides within the OS's virtual address space. Multiple distinct virtual address spaces require multiple distinct physical copies of (at least) portions of standard IPF firmware. As described further with FIG. 4 below, such portions of standard IP firmware include EFI boot services as well as PAL (processor) firmware so that processors executing inside the operating system which employ distinct virtual address mappings will not interfere with the other OS instances that may be running on separate processors in virtual partitions. This problem does not exist for the PA-RISC based solutions because firmware is architecturally defined to be executed in physical mode in those solutions. That is, the firmware for the PA-RISC processors is architecturally defined to be executed in physical mode, which enables a direct "emulation" of the PA-RISC firmware to be implemented by interposing the vPar Monitor layer of software between the actual platform hardware and firmware and the one or more OS instances residing in distinct (separate) physical RAM of the server, and utilizing distinct (non-shared) I/O hardware and processors.

Additionally, traditional soft partitioning techniques do not provide a separate firmware instance that provides a firmware interface for each soft partition. As mentioned above, in an IPF-based system IPF firmware may be called in virtual mode using virtual address mappings that are created and defined by the OS image such that the firmware resides within the OS's virtual address space. Multiple distinct virtual address spaces require multiple distinct physical copies of (at least) portions of standard IPF firmware. As described further below, in accordance with one embodiment of a soft partitioning technique an instance of firmware exists for each soft partition created on an IPF-based system, wherein each firmware instance provides an IPF standard firmware interface for its respective soft partition.

Thus, certain embodiments described below provide a soft partitioning technique that is compatible with industry standard IPF firmware interfaces. Accordingly, each soft partition of a system may have an instance of any IPF OS running thereon. Thus, embodiments described herein provide configuration flexibility to users, allowing them the option of running more than one instance of an IPF OS or different types of IPF OSs (e.g., LINUX, WINDOWS, VMS, HP-UX, etc.) within a single computer or hard-partitioned cellular computer. For instance, with reference to FIG. 11, according to one embodiment, an IPF-based computer system is partitioned into a plurality of soft partitions, in operational block 1101. An instance of a first type of OS runs on a first one of the plurality of soft partitions (block 1102), and an instance of a second type of OS runs on a second one of the plurality of soft partitions, wherein the second type of OS is different from the first type of OS (block 1103).

An example of soft partitioning enabled by an embodiment of this fPars technique is shown in FIG. 1. As shown, a hard partition 101 may be partitioned into a plurality of firmware partitions or "fPars", such as fPar 0, fPar 1, fPar 2, and fPar 3 of FIG. 1. Each fPar provides a soft partitioning technique that is compatible with industry standard firmware interfaces (e.g., ACPI, SAL, EFI, and PAL for IPF) and thus enable instances of well-behaved, standard IPF OS to be implemented on such fPar without requiring such OS to be changed (or minimizing any changes to be made in the OS). That is, each fPar is capable of booting any well-behaved, standard IPF OS provided that fPar contains adequate hardware.

In this sense, an OS is considered as well-behaved if it makes no assumptions about the hardware physical configuration, but instead relies solely upon the descriptions of the hardware provided to the OS through the industry standard firmware interfaces (e.g., EFI, SAL, and ACPI). Further characteristics that may be needed for an OS in certain systems are described further hereafter. An instance of an OS may need to be capable of starting at an arbitrary physical address and may not be able to reserve any specific physical address in order to avoid conflicting with other OSs running at that particular address. An instance may need to be capable of supporting multiple arbitrary physical holes in its address space, if it is part of a system configuration in which memory is shared between partitions. In addition, an instance may need to deal with physical holes in its address space in order to support "hot inswap" of memory. An instance may need to be capable of running entirely within its "private memory" if it is used in a system where instances do not share memory. Alternatively, an instance may need to be capable of using physical "shared memory" for communicating or sharing data with other instances running within the computer if the instance is part of a system in which memory is shared. Each instance may need some mechanism to contact another CPU in the computer system in order to communicate with it. An instance may also need to be able to recognize other CPUs that are compatible with its operations, even if the CPUs are not currently assigned to its partition. For example, the instance may need to be able to ascertain CPU parameters, such as clock speed, to determine whether it could run with that CPU, if the CPU was re-assigned to the partition in which the instance is running.

It should be recognized that the characteristics of "well-behavedness" for an OS to be utilized within fPars for an IPF-based system are not extensions beyond the architectural requirements of the IPF standards themselves. Thus, an OS that is fully compatible with the IPF standards is "well-behaved."

In accordance with certain embodiments, each fPar may comprise an instance of any well-behaved, standard IPF OS, such as IPF HP-UX, IPF LINUX, WINDOWS, and Open VMS, as examples. Various other such well-behaved, IPF OSs that are now known or later developed may be utilized in accordance with embodiments of the present invention. In general, the IPF standards are defined by Intel Corporation, and the decision of whether to support such IPF standards is left up to individual OS vendors. Further, as shown in the example of FIG. 1, the fPars may comprise different types of OSs. For instance, in the example of FIG. 1, fPar 0 comprises an instance of Open VMS, fPar 1 comprises an instance of IPF LINUX, fPar 2 comprises an instance of WINDOWS, and fPar 3 comprises an instance of IPF HP-UX running thereon.

As mentioned above, the soft partitioning techniques utilized by certain embodiments herein provide, for each soft partition, a firmware instance that provides an IPF standard firmware interface for its respective soft partition. Accordingly, an OS that is compatible with such IPF standard firmware interface may be utilized unmodified or with minimal modifications thereto. Because the standard IPF firmware interfaces are maintained for each soft partition, the OS need not be completely revised for a different firmware interface in order to enable soft partitioning. However, certain minor modifications may still be made to certain OSs. For example, a technical aspect of the IPF instruction set architecture forbids completely "standard" (i.e., shrink-wrapped) IPF OSs from actually functioning reliably in certain cases. More specifically, the IPF instruction set includes an instruction (ptc.g) that most IPF OSs use to perform global translation cache purges of all CPUs in the server. This instruction must be single-threaded. So, synchronization among all OS instances is required. Accordingly, such IPF OSs may be slightly modified with at least one software change that is "fPars-aware" to account for its usage of such ptc.g instruction. Alternatively, this may be accounted for in the firmware whereby the firmware interface instance intercepts the ptc.g instruction and modifies the operation thereof.

In accordance with one embodiment of the soft partitioning technique described herein, two kinds of functionality constraints within each fPar may exist: 1) those arising from hardware limitations, and 2) those arising from firmware-imposed limitations (such as limiting the permutations of main memory configurations). In one embodiment, configuration of fPars is achieved through changes to a persistent store (or "fPars configuration database") that defines the configuration. In this embodiment, the fPars configuration database is stored as an EFI variable using an OEM-specific Globally Unique Identifier ("GUID") and name. The fPars Non-Volatile Random Access Memory (NVRAM) definition of an EFI variable named "fpcfg" (for fPars configuration) is employed by the system firmware to construct each fPar segment when booting. This provides a persistent storage copy of an aggregate database that holds the low-level hardware identity of assignable resources, such as memory chunks, processors, and I/O cards. This database also contains policy variables. A copy of the fpcfg variable is maintained in a file in the EFI firmware partition of each boot device, either by fPar-aware tools or each EFI boot manager itself when it is booting inside an fPar. Because IPF standard interfaces already support dynamic reconfiguration of input/output (I/O), memory, and processors, these interfaces can be employed to reconfigure elements within each fPar, so that no new firmware architecture is required to perform online reconfiguration of fPar elements.

Thus, one embodiment uses an aggregated (C language structure) fpcfg variable. In an alternative embodiment, rather than using such an aggregate, a separate EFI variable under a single GUID for each configurable policy and resource is used.

Two primary fPars configuration use cases are supported by embodiments for soft partitioning described herein: 1) OS-absent, and 2) OS-present. "OS present" means the OS has booted and is running (online) the soft partition. "OS absent" means the firmware is in control of the soft partition, before the OS has booted. It is desirable to have the ability to configure/reconfigure partitions by interacting with the system in both use cases, and while the internal workings of those interactions may differ in each use case, they should both result in consistent configuration data.

In certain embodiments, OSs that do not support IPF standard device hotplug undergo a reboot to achieve a reconfiguration of the soft partitions. OSs that do support ACPI-mediated hotplug of one or more device types (memory, CPU, or I/O) do not need to reboot to change configuration. These operating modes may be referred to herein as "static fPars" and "dynamic fPars," respectively. The addition and ejection of memory devices (or "segments") for a soft partition may be achieved through ACPI interactions just like insertion and removal of a PCI device, provided the IPF OS of such soft partition supports ACPI 2.0 memory devices whose _HID value is PNP0C80 (see ACPI 2.0 spec table 5-42). Likewise, CPUs may be removed (returned to the unassigned pool) or migrated to a sibling partition, by utilization of the ACPI_EJ0 method of a processor after it has been returned to control of firmware. If, prior to ejection, this processor was directed to be added to a sibling fPar, through use of the fPars extension method SFPN (Set fPar Number), the recipient OS will receive an ACPI notification event to alert it to claim the CPU. This event appears as though a processor was "HotPlugged" into the hardware, though it really had already been present and in use by the ejecting fPar.

Figure 2:
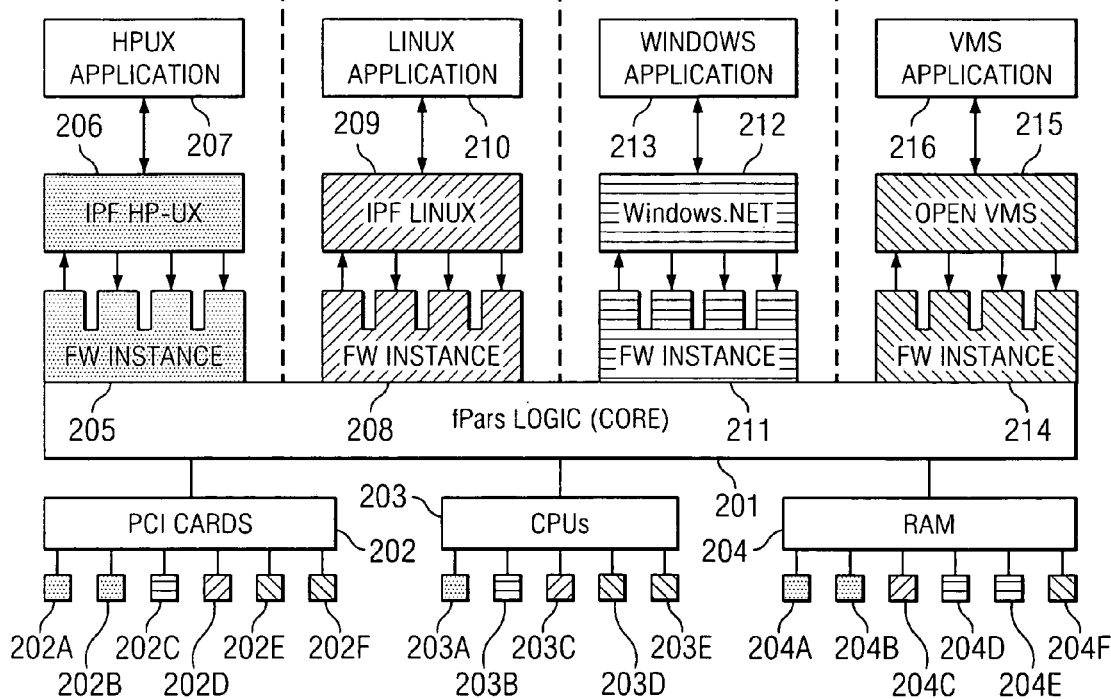
FIG. 2 shows an example high-level block diagram of one embodiment of a soft partitioning technique referred to herein as "fPars" partitioning, wherein a separate firmware instance is instantiated for each of a plurality of soft partitions and each firmware instance provides a pre-defined firmware interface for the operating system of its respective soft partition.

Turning to FIG. 2, an example high-level block diagram of an embodiment for soft partitioning is shown for implementing four (4) fPars within a hard partition as in the example of FIG. 1. While 4 fPars are described in many of the example implementations herein, it should be recognized that embodiments described herein may be utilized to implement any number of fPars (provided that sufficient hardware resources exist in the system), and thus in alternative implementations more or less than 4 fPars may be included on a hard partition. As described above, each fPar may comprise any well-behaved, standard IPF OS provided that the fPar contains adequate hardware (i.e., has adequate hardware resources assigned thereto). As with the example of FIG. 1, in the example of FIG. 2 a first fPar (corresponding to fPar 3 of FIG. 1) comprises an instance of IPF HP-UX OS 206 and HP-UX application(s) 207; a second fPar (corresponding to fPar 1 of FIG. 1) comprises an instance of IPF LINUX OS 209 and LINUX application(s) 210; a third fPar (corresponding to fPar 2 of FIG. 1) comprises an instance of WINDOWS OS 212 and WINDOWS application(s) 213; and a fourth fPar (corresponding to fPar 0 of FIG. 1) comprises an instance of Open VMS OS 215 and VMS application(s) 216.

Thus, the example of FIG. 2 comprises four (4) fPar soft partitions. Each fPar partition is assigned a non-intersecting description of resources within the hard partition. For example, each fPar instance controls or "owns" one or more IPF CPUs 203, one or more PCI cards 202, and one or more "segments" of physical memory (RAM) 204. In the example of FIG. 2, the first fPar instance (having an instance of IPF HP-UX OS 206 running thereon) is assigned PCI cards 202A and 202B, CPU 203A, and segments 204A and 204B of memory 204; the second fPar instance (having an instance of IPF LINUX OS 209 running thereon) is assigned PCI card 202D, CPU 203C, and segment 204C of memory 204; the third fPar instance (having an instance of WINDOWS OS 212 running thereon) is assigned PCI card 202C, CPU 203B, and segments 204D and 204E of memory 204; and the fourth fPar instance (having an instance of Open VMS OS 215 running thereon) is assigned PCI cards 202E and 202F, CPUs 203D and 203E, and segment 204F of memory 204.

The fPars logic 201 manages the assignment of hardware resources to the instances of fPar partitions ("soft" partitions), boots the fPar partitions and their kernels, and emulates certain firmware calls for each fPar partition. By emulating these specific calls, fPars creates the illusion to each instance of an IPF standard OS (e.g., IPF HP-UX 206, IPF LINUX 209, WINDOWS 212, and Open VMS 215) that it is running on a standalone computer having all of the hardware that has been assigned to it. The fPars logic 201 includes a "fPars configuration database." The configuration database contains persistent partition configuration information (e.g., stored to non-volatile memory). That is, the configuration database specifies the hardware resources assigned to each fPar instance. For example, the configuration database specifies that the first fPar instances (having an instance of IPF HP-UX OS 206 running thereon) is assigned PCI cards 202A and 202B, CPU 203A, and segments 204A and 204B of memory 204. Using the configuration database, fPars logic 201 may track which fPar instances exist and what hardware resources and partition attributes are associated with each fPar instance.

Further, in addition to implementing the above-described configuration database, in certain embodiments fPars logic 201 is also operable to perform one or more other functions, such as:

A) discovering the hardware present in a system (e.g., within a hard partition);
B) configuring the hardware;
C) using the NVRAM configuration and existing hardware, "segmenting" the hardware into one or more soft partitions and generate a "spanning namespace" and setup all of the NVRAM interfaces (see FIGS. 10A-10B) for EFI and ACPI access by each OS instance of offline configuration tool to use;
D) sequencing the launch of each IPF firmware instance and each OS instance on top of that firmware instance; and
E) segmenting the dynamic error response of the server (MCA, reset, and INIT behaviors, as well as SAL error logging).

According to certain embodiments, industry standard firmware interfaces are used to achieve the soft partitioning of fPars. For instance, in the example of FIG. 2, firmware instances 205, 208, 211, and 214 are implemented to provide standard IPF firmware interfaces for their respective fPar instance. As shown, firmware instance 205 provides a standard IPF firmware interface for IPF HP-UX OS 206; firmware instance 208 provides a standard IPF firmware interface for IPF LINUX OS 209; firmware instance 211 provides a standard IPF firmware interface for WINDOWS OS 212; and firmware instance 214 provides a standard IPF firmware interface for Open VMS OS 215. As described further below with FIG. 4, such standard IPF firmware interfaces may comprise ACPI, SAL, EFI, and PAL interfaces, as examples.

Because firmware instances 205, 208, 211, and 214 are implemented to provide standard IPF firmware interfaces for their respective fPar instance, each fPar may include any standard IPF OS without requiring that such OS be modified (or such OS may be minimally modified, e.g., to account for the ptc.g instruction, as described above). Thus, in this example embodiment, each fPar instance contains its own private instance of the IPF standard firmware services, and the descriptions provided by these services describe only those resources belonging to that fPar instance. For instance, IPF standard firmware instance 205 describes only those resources assigned to the first fPar instance (having an instance of IPF HP-UX OS 206 running thereon), i.e., firmware instance 205 describes only PCI cards 202A and 202B, CPU 203A, and segments 204A and 204B of memory 204 in the example of FIG. 2. The IPF standard firmware instances 205, 208, 211, and 214 share access to fPars logic 201 that is entirely abstracted by the IPF standard interfaces.

Unlike the soft partitioning technique described in U.S. Pat. No. 6,542,926 in which every soft partition runs an entire "stack" of software from the hardware on up to the applications (e.g., each soft partition has a separate copy of "console"), in this example embodiment of fPars one copy of the "core" logic 201 is implemented for all of the soft partitions and separate copies of the IPF standard firmware services (205, 208, 211, and 214) are implemented for the soft partitions (e.g., a separate IPF firmware instance is running for each soft partition, as shown in the example of FIG. 2). Accordingly, this embodiment of fPars has a shared core with a "shared nothing" set of firmware instances above it using a "layered" software architecture model. In certain embodiments, the core 201 includes information identifying the resources across all soft partitions, and the individual firmware instances identify the resources available (assigned) to their respective soft partitions.

Further, certain embodiments enable static and/or dynamic soft partitioning. For example, resources of an fPar instance may be dynamically changed (during system run-time) by modifying the configuration database of fPars logic 201 to specify different resources (e.g., more or less resources) for such fPar instance. Any OS that supports dynamic configuration allow for resources to be dynamically changed in a soft partition running such OS. For instance, suppose a system has 3 fPar partitions, two of which are running OSs that support dynamic configuration; in this case, resources may be dynamically migrated (without shutting down) between the two partitions running OSs that support dynamic configuration, while static configuration may be performed on the soft partition running the OS that does not support dynamic configuration (by shutting down this OS and changing the configuration of its respective soft partition). In accordance with one implementation, an OS may support dynamic configuration by providing:
1) basic ACPI hotplug capability for resources (e.g., PCI, CPU, and Memory devices);
2) some OS-specific Online Soft Partitioning Configuration tool that enables administrators to configure fPars. This tool is fPars-aware and knows about the EFI fpcfg variables and the ACPI extensions implemented for certain embodiments of fPars (for supporting dynamic migration of resources); and
3) optionally, OS kernel schedulers may be modified to dynamically load-balance CPUs among sibling fPars without need for an (or in addition to) an application-level tool to do so.

In view of the above, certain embodiments described herein enable soft partitioning of IPF-based systems, wherein such soft partitioning technique is compatible with standard IPF firmware interfaces such that any standard IPF OSs may be implemented in each soft partition without (or with minimal) modification to the OS (i.e., the IPF OS can make its normal IPF firmware calls for accessing the hardware resources assigned thereto). This enables the resources of a single computer or a single hard partition to be isolated between a plurality of soft partitions. Thus, the advantages of soft partitioning may be recognized for an IPF-based system (and for any one or more well-behaved IPF OSs desired to be used) without requiring modification of the OS (or minimizing the modification to the OS). Example implementations of certain embodiments of the fPars partitioning technique are described further below.

Figure 3:
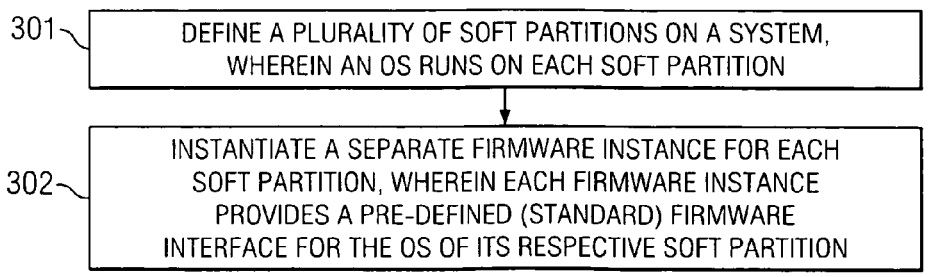
FIG. 3 shows an operational flow diagram of certain embodiments of a soft partitioning technique, such as that of FIG. 2.

FIG. 3 shows an operational flow diagram of certain embodiments of a soft partitioning technique, such as that of FIG. 2, as described further herein. In operational block 301, a plurality of soft partitions are defined on a system, and an OS runs on each soft partition. Defining a soft partition may be achieved by assigning certain system resources to such soft partition, as with the fpcfg configuration database described further herein. Of course, a user interface may be provided in certain implementations to enable a user to define the fPartitions desired (e.g., by interacting with the fpcfg configuration database). In operational block 302, a separate firmware instance is instantiated for each soft partition, wherein each firmware instance provides a pre-defined (standard) firmware interface (e.g., standard IPF firmware interface) for the OS of its respective soft partition. For instance, firmware instances 205, 208, 211, and 214 are instantiated for four separate soft partitions in the above example of FIG. 2. In certain implementations, as described further herein, the pre-defined firmware interfaces provided by the firmware instances may be utilized to dynamically migrate resources from one soft partition to another soft partition, as desired.

Figure 4:
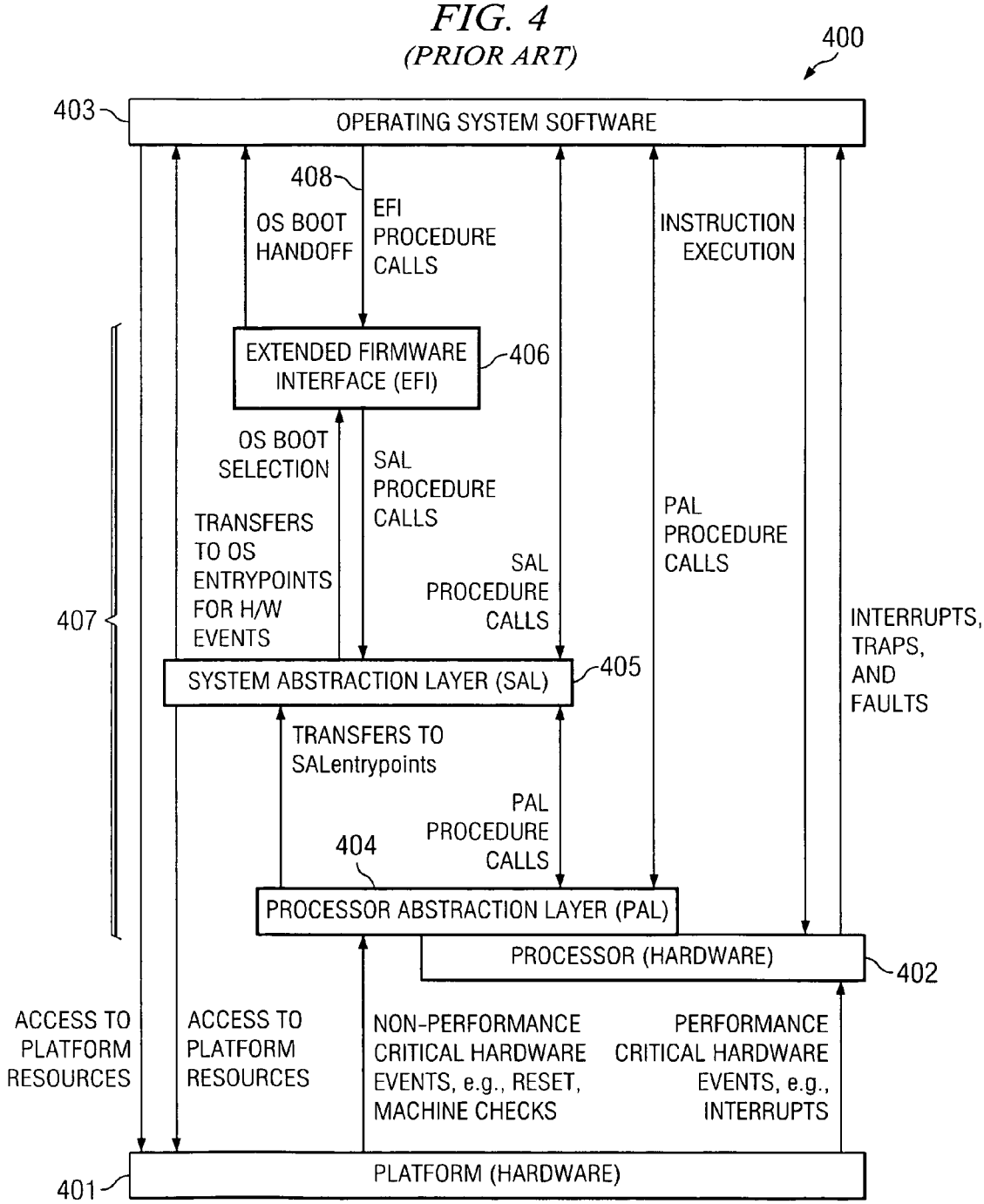
FIG. 4 shows an abstract model of a typical IPF-based computer system, illustrating standard firmware interfaces of such IPF-based computer system.

An example implementation of a preferred embodiment is described further below in conjunction with FIGS. 4-5. FIG. 4 shows an abstract model of a typical IPF-based system 400, which comprises hardware platform 401, processor(s) 402, OS 403, and system firmware 407. In this example implementation, system firmware 407 comprises a Processor Abstraction Layer (PAL) 404, System Abstraction Layer (SAL) 405, and Extended Firmware Interface (EFI) 406.

Various processor architectures are known in the art, such as the PA-RISC family of processors developed by Hewlett-Packard Company ("HP"), Intel Corporation's ("Intel") architecture ("IA") processors (e.g., the well-known IA-32 and IA-64 processors), and the like. As is well-known, IA-64 is a 64-bit processor architecture co-developed by HP and Intel, which is based on Explicitly Parallel Instruction Computing (EPIC).

The example system 400 shown in FIG. 4 follows the well-known IA-64 architecture, such as is implemented for the well-known ITANIUM processor family. While embodiments may be implemented within any other IPF architectures (and therefore are not limited solely to the IA-64 architecture shown in FIG. 4), a preferred embodiment is described hereafter as being implemented for use within the IA-64 system architecture of FIG. 4. The IA-64 processor architecture definition specifies requirements for firmware architectural elements of systems utilizing IA-64 processors. The quintessential model of this architecture is given in the *Intel IA-64 Architecture Software Developer's Manual, Volume 2: IA-64 System Architecture*, in section 11.1 *Firmware Model*. It describes that the IA-64 firmware comprises three major components: PAL 404, SAL 405, and EFI 406, which together provide the processor and system initialization for an OS boot. The three components 404, 405, and 406 may not represent all of the required system firmware functionality for certain IA-64 computer systems, but further firmware may also be included.

Hardware platform 401 represents the collection of all of the hardware components of system 400 (e.g., of a hard partition), other than the system's processors 402. The arrows shown in the abstract model of FIG. 4 between these various components indicate the types of permitted interactions for the behavior of system 400. When system 400 is first powered on, there are some sanity checks (e.g., power on self-test) that are performed by microprocessors included in platform 401, which are not the main system processors 402 that run applications. After those checks have passed, then power and clocks are provided to processor 402. Processor 402 begins executing code out of the system's ROM (not specifically shown in FIG. 4). The code that executes is the PAL 404, which gets control of system 400. PAL 404 executes to acquire all of the processors 402 such that the processors begin executing concurrently through the same firmware.

After it has performed its duty of initializing the processor(s) 402, PAL 404 passes control of system 400 to SAL 405. It is the responsibility of SAL 405 to discover what hardware is present on platform 401, and initialize it to make it available for the OS 403, primarily main memory. When main memory is initialized and functional, the firmware 407 (i.e., PAL 404, SAL 405, and EFI 406, which is not running yet) is copied into the main memory. Then, control is passed to EFI 406, which is responsible for activating boot devices, which typically includes the disk. EFI 406 reads the disk to load a program into memory, typically referred to as an operating system loader. EFI 406 loads the OS loader into memory, and then passes it control of system 400 by branching one of the processors 402 (typically called the boot startup processor) into the entry point of such OS loader program.

The OS loader program then uses the standard firmware interfaces 407 to discover and initialize system 400 further for control. One of the things that the OS loader typically does in a multi-processor system is retrieve control of the other processors. For instance, at this point in a multi-processor system, the other processors may be executing in do-nothing loops. In an Advanced Configuration and Power Management Interface ("ACPI")-compatible system, OS 403 parses the ACPI static tables to discover the other processors of a multi-processor system 400 and compile ACPI DDBs in the tables into the ACPI "namespace" with AML objects and methods. Then, OS 403 uses the firmware interfaces 407 to cause those discovered processors to branch into the operating system code. At that point, OS 403 controls all of the processors and the firmware 407 is no longer in control of system 403. At runtime, the OS interprets the ACPI namespace and interacts with its objects to perform various functional steps.

As OS 403 is initializing, it discovers from the firmware 407 what hardware is present at boot time. And in the ACPI standards, OS 403 also discovers what hardware is present or added or removed at run-time. In discovering hardware that may be present in an ACPI-compatible system, OS 403 accesses the system's ACPI table(s). The OS uses function calls during the system initialization to find out the address of the ACPI tables. A pointer to those ACPI tables is passed in the EFI system table pointer, which is obtained by making one of the standard EFI procedure calls 408 in FIG. 4. So, EFI procedure calls 408 are used to pass the address of the ACPI tables which describe the hardware of system 400. Such ACPI tables that OS 403 accesses at boot time describe the resources available to system 400.

An example firmware architecture that may be implemented for the above IA-64 architecture of FIG. 4 in accordance with one embodiment of the fPars partitioning technique is shown in FIG. 5. Such example firmware architecture is referred to as Banyan architecture herein. FIG. 2 above shows an example block diagram of the Banyan architecture.

The specific example Banyan architecture 500 of FIG. 5 is an application of a Framework plus Components model. In general, a framework is a domain-specific set of software functionality that comprises the major body of the system functionality. Components interact collaboratively with the framework and each other via clearly defined interfaces to achieve the overall system function. Co-pending and commonly assigned U.S. patent application Ser. No. 10/684,985 titled "SYSTEM AND METHOD FOR DEVELOPMENT OF FIRMWARE" filed Oct. 14, 2003, the disclosure of which is hereby incorporated herein by reference, further describes use of this example Banyan architecture for efficiently developing firmware. Thus, the example embodiment of FIG. 5 may be utilized to enable efficient development of the firmware for implementing fPars (e.g., for implementing the firmware interfaces 205, 208, 211, and 214, and fPars logic 201 described above in connection with FIG. 2).

Banyan firmware 500 represents all of the non-CPU-specific (e.g., PAL) system firmware that executes on the IPF computational processors, as opposed to management processors (MP) and utility microcontrollers. It is responsible for handling reset and power on events, hardware discovery and initialization, hardware description, system software loading and launching, and hardware dependent functions during normal system operation, including hardware reconfiguration and error handling. From the PAL perspective, Banyan firmware 500 appears to be SAL.

Each element of this example Banyan architecture 500 is described as follows:

(1) ACPI Tables 508: ACPI tables 508 are well-known tables for describing resources of an ACPI-compatible system to its OS. Descriptive data and code for a resource may be included in the ACPI tables. These descriptions include static tables as well as namespace objects containing ACPI Machine Language (AML). The AML, which is an interpreted language, supports the option to implement control functions. This allows the OS to execute firmware-like operations in a fully controlled runtime context. The value of this approach is to protect itself from aberrant firmware, while still not having to include a myriad of hardware dependent functions all similar and yet different for each platform upon which the OS runs.

The Banyan system may be implemented to contain the capability to dynamically generate AML program segments at boot time, based on the actual hardware present in a system, such as is described more fully in co-pending and commonly assigned Published U.S. Patent Application No. 2004/0243534 titled "SYSTEM AND METHOD FOR GENERATING ACPI MACHINE LANGUAGE TABLES" filed May 28, 2003, the disclosure of which is hereby incorporated herein by reference.

(2) ACPI Agent 509: ACPI Agent 509 is responsible for exporting ACPI (standard) firmware functionality. In this model, it is code that is given control during bootstrap, after the core 501 is initialized, during which it converts internal representations of the system to those required by the external standards. It is similar to a proxy design pattern in that it separates evolution of the ACPI interface from those employed internally to describe the system and to control some hardware functions.

(3) EFI ABI 510: EFI ABI 510 is the IA-64 standard set of external interfaces (procedure call based) that provides boot services to the OS loader and early OS initialization code. It also contains a very minimal set of runtime services that are available even after the OS is given full control and when the boot-time services become unavailable. The EFI package may also contain an EFI-boot-driver runtime infrastructure to support standard EFI boot drivers.

(4) SAL ABI 511: This veneer (another Adapter Pattern) implements the standard IA-64 firmware procedure interfaces required by the IA-64 architecture. It also implements the OEM-specific procedures for product differentiation functions. Internally, there may be separation of OEM specific functionality into a sub-package or separate component(s).

(5) SAL PMI 512: Platform Management Interrupt (PMI) is a mechanism that the processor provides to enable functional extensions that do not require operating system support or new firmware interfaces. Typically, such functionality would be implemented with a combination of specialized hardware with firmware assist. Thus, there typically is a mechanism to trigger the firmware assist that is built into the processor and supported by PAL. The SAL PMI adapter is similar to ACPI Agent 509, EFI ABI 510, SAL ABI 511 in that the program image is instantiated as a separate program entity into main memory by the sequencer. However, it differs from these others which provide an interface between operating system software and firmware. Instead the SAL PMI provides an interface between PAL and SAL. The PMI interruption is a hardware event which is architecturally handled by SAL (from PAL's perspective), but in this modular Banyan system, is best implemented as a program separate from SAL, layered "on top" of the Banyan core just as the other memory-resident adapters.

(6) Portable Core (or "database", e.g., "configuration database") 501: This is a multi-package package, implementing a number of capabilities. A complete, dynamic description of the system hardware configuration is maintained in a subsystem that implements the "Device Tree" architectural pattern 505. Core I/O drivers, such as console, for bootstrapping the framework are part of this package as are remote console protocols, debugger support 507, system initialization coordination, error handling coordination, and essentially most of the firmware system functions that can be made portable.

According to this example embodiment of FIG. 5, core 501 implements fPars logic 201 of FIG. 2. The elements of the core 501 are described more fully as follows:

(a) Device Tree 505: The Banyan Component Tree package which is a dynamic system of bound-components representing the system platform hardware and software components. Device Tree 505 describes all hardware in the hard partition (it therefore provides a union of the hardware of each soft partition). Device Tree 505 also contains software objects, one of which is the fPars component. This software object contains code and data that support interactions with the fpcfg NVRAM variable that actually contains the "database" of what hardware belongs to each fPar. This variable also contains the data necessary for the fPars component to subdivide the installed memory devices into many "pseudo" memory devices which are non-intersecting regions of physical memory that appear to the OSs as individual memory devices in the OS namespace. Thus, device tree 505 represents the "spanning namespace" (which is the union of all the namespaces in each fPar instance). In this example embodiment, every OS instance implemented on a hard partition (e.g., within a soft partition) has a description of all of the hardware of a hard partition, but the ACPI_STA (status) object in the device scope of each device in the namespace indicates whether or not that OS instance "owns" that device.

(b) Tree Components 506: This represents the aggregation of loosely coupled binary images of components available for instantiating into the device tree 505. Some are "software packages" representing sharable services such as network protocols, buffer caching, et., and others are "hardware packages" that implement "device nodes" in the tree that correspond to actual system hardware components. The instantiated components reside in the component tree that is constructed at boot time. Thus, tree components 506 include the hardware resources of a hard partition that may be assigned to a fPar instance as specified by the "fpcfg" variable 61 shown in FIGS. 6-8, which are discussed further below.

(c) Debugger 507: This package represents an interactive debugger function that supports both local and remote models of debugging. The remote model can be connected through any supported device (typically a serial or LAN connection). The local debugger is expected to be used through a direct link connection. Local debugging may not support source level debugging because required symbol tables may not be available.

(d) Core Framework 502: The supporting services that include memory management, primitive console etc., that support the device tree package 505, but which are better collected outside of that package for modularity purposes. The major "component binding" and "component framework" infrastructure error handling infrastructure, and "OS-like" infrastructure (locking primitives, lock tracing, event logging, etc. may be implemented here).

(e) Event Sequencer 503: The two primary kinds of events that require sequencing include initialization events and error handling events. This package does not represent a centralized handling mechanism; rather we think of this as a "conductor" of an "orchestra" of different musicians. Each musician knows how to play its own instrument (init, handle error) but not the score of the entire symphony. The conductor knows the score, but not how to play each instrument. Sequencer 503, like the conductor, serves as "coordinator". This provides the benefits of both a distributed error handling system and a centralized error handling system without the detriments.

(f) SAL Substrate 504: This package represents the SAL_ENTRY functionality that matches the PAL requirements. It also contains some platform dependent fabric initialization primitives and error handling framework. There is also a set of platform-independent functionality that is or may be processor instruction set dependent. Processor model-dependent code can be implemented in this substrate package or in the component that corresponds to the processor (or a combination of both). SAL_Substrate also exports services to other packages and component tree components.

While an example technique of implementing the firmware for fPars in accordance with one embodiment of fPars is described in conjunction with the architecture of FIG. 5, various other techniques may be utilized for developing/implementing such firmware. Accordingly, the embodiments presented herein are not intended to be limited solely to implementations developed from the example Banyan architecture of FIG. 5, but are instead intended to encompass various other architectures for implementing the soft partitioning of IPF-based systems (or other systems having predefined (e.g., industry standard) firmware interfaces). However, it is believed that by using the Banyan architecture of FIG. 5, and as described in co-pending and commonly assigned U.S. patent application Ser. No. 10/684,985 titled "SYSTEM AND METHOD FOR DEVELOPMENT OF FIRMWARE," the firmware for implementing soft partitioning of an IPF-based system may be efficiently developed.

FIG. 6 shows a high-level diagram of the example Banyan software stack implemented within a hard partition in accordance with a preferred embodiment. That is, FIG. 6 shows an example of the software stack for one fPar instance implemented on a hard partition. As described with FIGS. 2-3 above, multiple of such fPar instances may be implemented within a single hard partition, wherein the firmware interfaces 603, 604, 605, and 606, described further below, may be duplicated for each soft partition. The example fPar instance of FIG. 6 includes an IPF OS 607 and corresponding application(s) 608. For instance, in the example of FIG. 2, a first fPar instance includes IPF HP-UX OS 206, and HP-UX application(s) 207. A firmware instance provides standard IPF firmware interfaces 603, 604, 605, and 606 for the example fPar instance of FIG. 6. For instance, in the example of FIG. 2, the first fPar instance includes firmware instance 205, which in the example implementation of FIG. 6 would include ACPI Agent 603, EFI adapter 604, SAL adapter 605, and PAL image 606. ACPI agent 603 corresponds to ACPI agent 509 described above in FIG. 5. Similarly, EFI adapter 604 and SAL adapter 605 correspond to EFI ABI 510 and SAL ABI 511, respectively, of FIG. 5. And, PAL image 606 corresponds to PAL 404 of FIG. 5.

Further, PMI agent 602 corresponds to SAL PMI 512 of FIG. 5. PMI agent 602 is a "Platform Management Interrupt" agent, which is required by the IPF instruction set architecture. This firmware is required to be RAM-resident (not ROM) and SAL must register its address with PAL in every CPU in the partition. Furthermore, CPU implementations are allowed to forbid re-registration of PMI handler addresses. Therefore, in order to support CPU migration, there must be only a single copy of the PMI handler in an fPars system, and this handler must support "segmented" behavior. This example embodiment uses PMI to simulate a processor reset without requiring the CPU to actually go through the PAL cold-reset path.

Additionally, Banyan framework/component core 601 corresponds to Banyan core 501 of FIG. 5 and implements the fPars logic 201 of FIG. 2. Thus, Banyan framework/component core 601 provides a configuration database (e.g., NVRAM variable "fpcfg" 61) that specifies the hardware resources assigned to this fPar instance of FIG. 6, and IPF OS 607 can utilize standard IPF interfaces 603, 604, 605, and 606 to access its resources in a manner that it would if it were implemented as a sole IPF OS of a hard partition (with no soft partitions). In this example embodiment, neither core 601 nor PMI agent 602 are replicated (but rather there exists one copy of these components across the soft partition), while there is a per-instance (i.e., per soft partition instance) copy of interfaces 603-606.

FIG. 7 shows a high-level Use Case diagram that illustrates four different use cases (types of interactions) with the persistent fPars configuration database functionality represented by element 61 of FIG. 6 according to one embodiment. The core use case, 703, represents an interaction that is used by each of the external use cases, 701, 702 and 704. Use case 701 represents the configuration of fPars when an operator, 709, interacts with the firmware in the absence of an operating system (707, 708) using a firmware user interface (705) that may be built into the firmware or transiently loaded as firmware (EFI) application program that leverages the firmware application binary interface (706) of EFI adapter (604). The 'Configure Online' use case (702) represents an operator (709) interacting with an operating system (707) through a user interface program that runs on that operating system (708) to change fPars configuration. Some operations performed in both 701 and 702 scenarios include the creation of new fPars and assigning ownership of hardware resources to them. Another operation includes performing an 'inventory' of the available hardware in the server which may be apportioned to fPars the operator wishes to boot. An interesting set of use cases is represented by "Automatic Migration" (704) in which concurrently running operating systems, each within a sibling fPar instance collaborate to migrate ownership of hardware from one fPar to another with or without operator intervention. For example, depending on system load, hardware resources may be shifted among the fPar instances with the decision and its initiation determined by heuristics within the collaborating operating systems.

Figure 8:
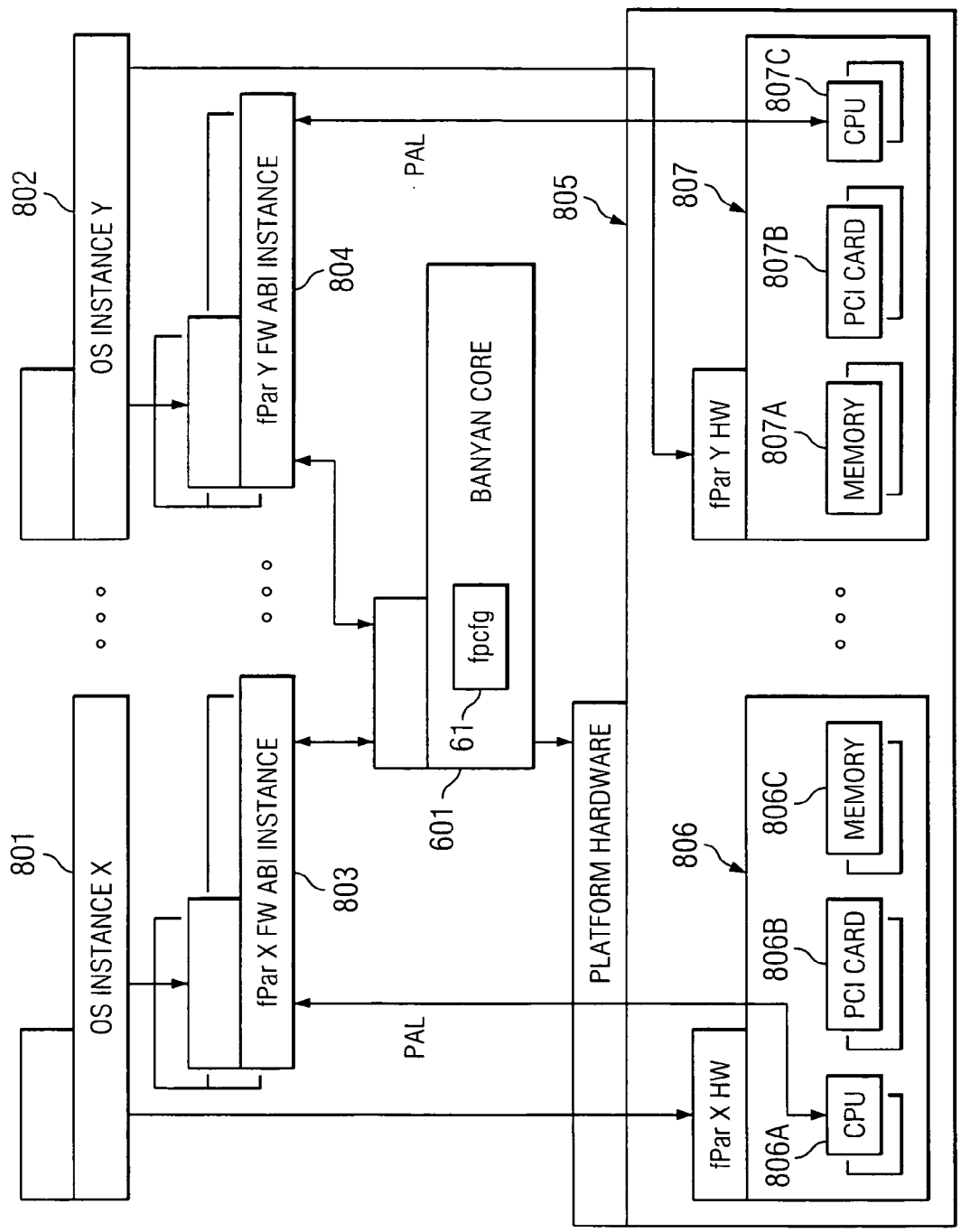
FIG. 8 shows an example fPar domain model in accordance with one embodiment of the fPar soft partitioning technique.

FIG. 8 shows an example fPar domain model in accordance with one embodiment of the fPar soft partitioning technique. In accordance with this example, the fPar model is basically a superset of an nPartitions model. However, instead of having a single instance of the firmware services, there are "n" instances of the firmware services for the "n" number of soft partitions. Each instance has its own text and data and resides in separate physical address space within the memory of an nPartition. The hardware resources utilized by each fPar instance are generally non-shared resources: separate processors, separate I/O cards and separate regions of physical memory within an nPartition. In accordance with certain embodiments, the number of fPars that may be configured within an nPartition varies (e.g., from 1 to 64 in an IA-64 architecture).

The example model of FIG. 8 illustrates two active fPar instances within an nPartition. One fPar instance comprises an IPF OS instance X (labeled 801 in FIG. 8) running thereon, and the second fPar instance comprises an IPF OS instance Y (labeled 802 in FIG. 8) running thereon. Banyan core 601 comprises an fPars configuration database (e.g., NVRAM variable "fpcfg" 61, as described above) that specifies the resources of platform hardware 805 that are assigned to each of the two fPars. For instance, in this example, hardware resources 806 are assigned to fPar X, which include CPU(s) 806A, PCI card(s) 806B, and memory segment(s) 806C, and hardware resources 807 are assigned to fPar Y, which include CPU(s) 807A, PCI card(s) 807B, and memory segment(s) 807C.

It should be noted that there is one instance of the Banyan core 601 that is shared by all of the fPars (in this case, two fPar instances) within the nPartition. The firmware interface instances 803 and 804 abstract shared resources so that each OS is essentially completely unaware of the other fPar instances during normal (non-fPar related) operational scenarios. When fPar-related scenarios occur, there is some value in becoming aware of other fPars within the nPartition. For example, a configuration tool may be run in fPar X to create and boot a new fPar Y using available resources within the nPartition (i.e., those resources assigned to the new fPar Y as defined by configuration database fpcfg 61). It should be recognized that the above-described example implementation of FIG. 8 is much different than the soft partitioning technique of U.S. Pat. No. 6,542,926, for example, in which each soft partition runs a completely separate copy of the "console" program and there exist complex protocols for dealing with the multiplicity of sequential and parallel boot and reboot scenarios.

Another example of a fPar-related scenario in which it is valuable for an fPar to be aware of other fPars within the nPartition is when migrating devices between fPar partitions. Another example of such a fPar-related scenario is the performance of diagnostics that want to monitor the health of all of the hardware but have a program running in only one fPar instance. Such a diagnostic system may be structured whereby a daemon process running in each fPar OS instance collects data and forwards it to a high-level user-interface tool running in a single fPar (or elsewhere) where the multiplicity of data is aggregated (a roll-up of all the hardware at the "nPartition" level).

In accordance with certain embodiments, the fPars partitioning technique may include several mechanisms that enable one fPar to become aware of the existence of another fPar, including the following:

A) FPN method values in devices identify the fPar number of the owning fPar for every device that can be assigned to an fPar. In order for any fPar to take an inventory of all hardware, this data is used, and is one of the values for exposing the spanning namespace to every soft partition on a given hard partition.

B) The fpcfg variable itself implies existence of other fPars and is visible by every fPar.

C) Memory devices can be assigned as shared resources and OSs can use these regions to send/receive messages to each other using a variety of algorithms.

D) FPars provides a "Shared EFI Variable GUID" namespace that all fPars may access. This allows one OS instance to set an EFI variable and any other OS instance (fPar sibling) to read or set that variable. OSs that know the value of this GUID can use it to send each other messages without having to map-in particular memory regions or worry about locking protocols.

E) OSs can (when they are running) use directed interprocessor interrupts (IPI) sent to other CPUs listed in their ACPI namespace as (present and functioning, but disabled). This mechanism, augmented by the Shared EFI Variable GUID can be used to implement a "heartbeat" function in an OS agnostic fashion.

In the example of FIG. 8, the OS of each fPar may use standard IPF firmware calls to interface with its respective resources, just as the OS would if it were implemented as the sole OS on an IPF-based system (with no soft partitioning).

Figure 9:
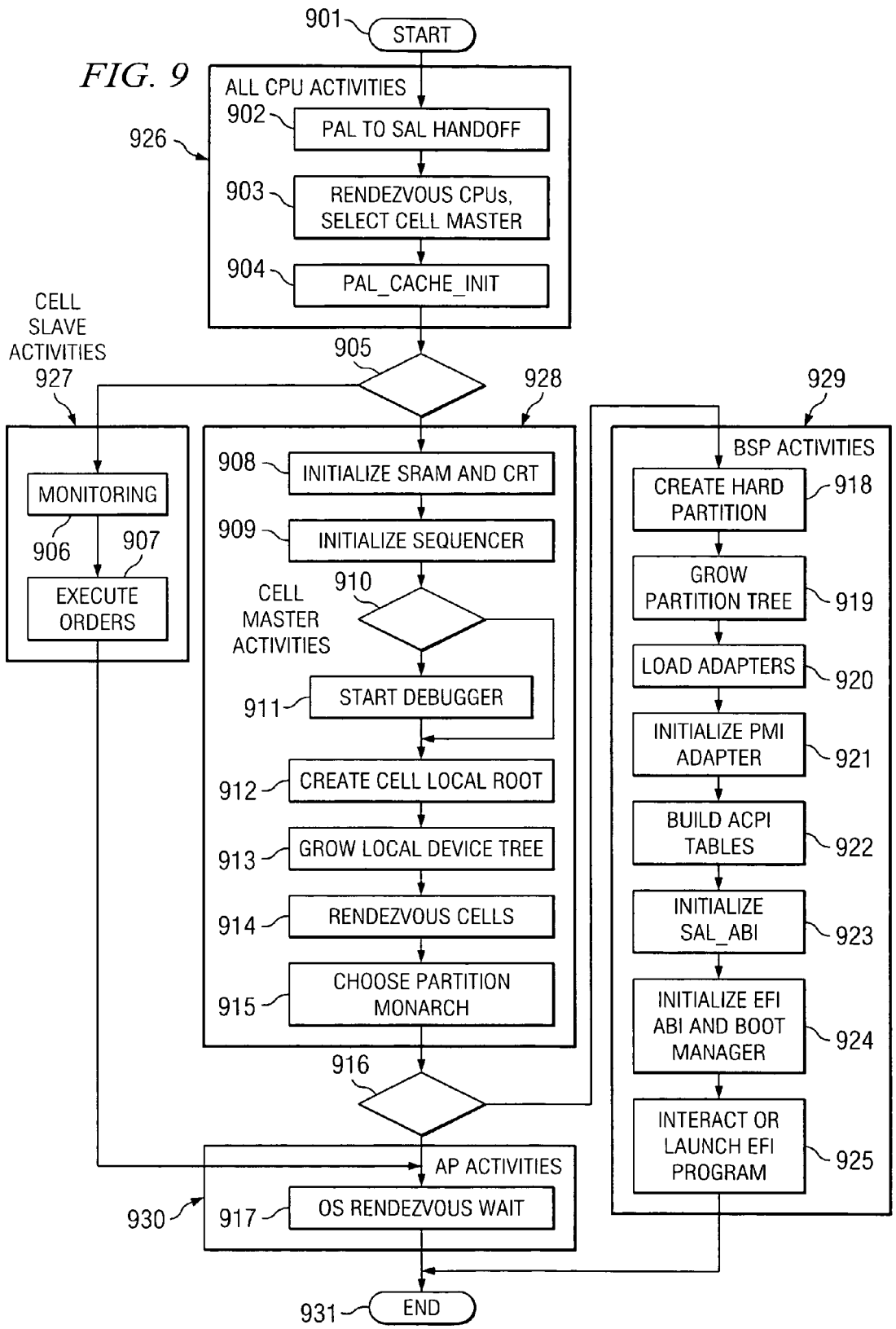
FIG. 9 shows an example of a traditional nPartition boot sequence.

FIG. 9 shows an example operational flow diagram 900 for an initial bootstrap of a cellular IPF computer system from power on. A similar but simpler sequence may also be employed when this firmware is used to boot and configure a non-cellular IPF computer system.

Operational block 901 represents the power-on reset and execution of the Intel Processor Abstraction Layer (PAL) Firmware (labeled 404 in FIG. 4) whose innermost workings are proprietary. Exiting PAL and entering operational block 902 is the first time the System Abstraction Layer (SAL) firmware (labeled 405 in FIG. 4) is executed following a reset. SAL is the architectural name for all of the non-processor firmware represented in this diagram in operational blocks 902-930.

Each cell (of a multi-cell configuration) contains a copy of the same firmware and begins its initialization without knowledge (yet) of or the ability to communicate with the other cells that will join it in forming what is referred to as a "hard partition", or "nPar". Operational block 926 ("ALL CPU ACTIVITIES") represents a sequence of operations that every CPU exiting PAL and entering SAL performs.

Operational block 902 represents the architected SAL to PAL handoff defined by the Intel IPF architecture specification previously cited. Operational block 903 represents the firmware that performs the health-check (status from PAL) and multi-CPU rendezvous to select the single processor (called here Cell Master) that will continue with cell initialization shown in block 928 ("CELL MASTER ACTIVITIES"). Unhealthy processors (those that fail PAL self tests) are prevented from continuing execution beyond this block. It will be readily seen by one skilled in the art that unhealthy processors will need to be held in a state that does not proceed through to subsequent steps. Many embodiments of hardware and/or firmware exist in the art for effectively achieving such a function and thus are not described further herein.

Healthy processors continue processing after the cell master selection by entering operational block 904 where each processor calls the PAL service to initialize its own internal cache memory. Following the cache initialization of block 904, each CPU executes a decision (905) and either enters the operational block labeled CELL SLAVE ACTIVITIES (927) or CELL MASTER ACTIVITIES (928).

If the CPU is a slave it begins monitoring (906) for orders from the master for it to execute in block 907. Examples of orders include coordinated Self Test operations as well as commands to continue on to become an Application Processor (AP) in operational block 917. Since it is possible for the Cell Master CPU to fail during later self-test operations, the Slaves also monitor the forward/progress and health of the Master. Upon detecting a master failure (by observing lack of forward progress through the processing steps 908-915), a cell slave will promote itself to master and perform deconfiguration of the master, log the error event and then reset the server. Upon reboot, a different, presumably healthy master will be selected and boot will proceed further.

Since each Cell in a multi-cell server contains a Cell Master, the operational blocks 908-915 may be performed in parallel by each cell according to its own configured hardware. This parallelism is very desirable in large servers which have large I/O hardware configurations because the discovery and initialization of I/O hardware components is usually very time-consuming. Also, the configuration and initialization of large physical memory arrays also benefits from such per-cell parallelism during boot.

Up through this decision point (905), the CPUs are executing without a stack using only registers and ROM. Because cellular memory systems are quite complex to configure, it is desirable to create the firmware that performs this work in a high level language, such as C. C is a procedural language requiring a large stack and heap. This means the firmware cannot use the memory to initialize the memory. Therefore, it is typical of such systems to include a small amount, perhaps 1 megabyte, of special memory that is trivial to initialize. Such memory is often low-performance and not necessarily coherent. In this example embodiment, such memory is called SRAM (Static RAM). Therefore, the first critical task for the cell master is to initialize the SRAM and C-runtime (CRT) environment so the rest of the processing steps (including the slaves) can be written in the high-level language that requires a stack, and software resources such as a heap and interrupt tables may be used. This work is represented by operational block 908 in FIG. 9. After the stacks and their backing store (an IPF requirement) are created by the master for each CPU in its cell, orders are sent to the monitoring (906) slaves to command them (907) to initialize their internal registers to use the new stacks and interrupt tables. Subsequently slaves can be commanded to execute orders also written in high level language.

The cell master then initializes data structures used for orchestrating the careful sequencing of the rest of the cell boot strap, as shown in block 909. Block 910 provides a decision point that enables an internal debugging module if a Non-Volatile RAM (NVRAM) configuration option had been previously set to true. If this variable is true operational block 911 is performed. This debugger contains a simple UART and/or LAN device driver for interactive or remote debugging. If the variable is false, the Cell Master skips block 911 and continues with its per-cell initialization in block 912

Operational block 912 creates the root of a tree-based (hierarchical) database employed by the Banyan firmware architecture and initializes the minimal component/framework data structures to allow growing branches and nodes of the database. Operational block 913 represents the discovery and initialization of various hardware elements within (e.g., memory, IO) and connected to (e.g., IO) the cell. As elements are discovered and initialized the tree database 'grows' new branches and nodes.

Following block 913, which is occurring in parallel on each cell of the intended partition, the cells communicate with each other and determine which cells are actually booting and healthy. The intended set of cells is described in an NVRAM database that is stored within each Cell prior to its release from reset by the power controller subsystem. This cell rendezvous in block 914 is done through complex cell-to-cell interactions using special hardware that does not yet depend upon functioning main memory. The purpose of this operation (914) is to discover the set of Cell Masters that are ready to become the Partition Monarch.

In block 915, the Cell Masters participating in the Rendezvous Cells (914) operation choose one of them to become the Partition Monarch. According to the outcome of this process a decision is executed (916) by each Cell Master. The CPU that is the Partition Monarch continues to initialize the server in operational block 929, and the Cell Master processors that are not promoted become Partition Slaves and enter the Application Processor wait loop 917 from which they are later launched by the operating system. The Partition Monarch also becomes the IPF "Boot Startup Processor" (BSP) that launches the OS, so operational block 929 is labeled "BSP Activities".

The first critical step the partition monarch performs is to initialize the hardware within each cell to 'connect' the cells into a single, large, Symmetric Multi-Processing (SMP) server. This is represented by operational block 918. Having done this, it is then possible to re-initialize the memory controllers within each cell to interleave memory across multiple cells. It is then also possible to graft the roots of each cell local device tree into a single rooted-tree called the partition tree. Also, partition-level firmware database structures such as the NVRAM manager for EFI variables are initialized and made ready during the Grow Partition Tree (919) operation.

Finally, main memory is now ready to be used to load PAL (404) and SAL_PMI (512), and the OS-interface adapters of FIG. 5: EFI_ABI (510), SAL_ABI (511) and ACPI agent (509). This step is represented by operational block 920 in FIG. 9.

The PMI (Platform Management Interrupt) adapter is initialized first in operational block 921 and handlers for the four SAL PMI levels (0, 1, 2, and 3) are registered with this adapter.

Memory is selected for the ACPI tables and they are constructed by calling into the ACPI Agent in operational block 922. The ACPI agent (509) is not an OS interface adapters like SAL and EFI which both expose a procedural interface to the operating system. Instead it provides the ACPI table construction and AML generation facilities used during boot and for Cell Hot plug when a cell is added after the system has booted. At that time, new AML describing the added cell hardware is generated. In certain embodiments, such AML may be dynamically generated as described in co-pending and commonly assigned U.S. patent application Ser. No. 10/446,950 entitled "SYSTEM AND METHOD FOR GENERATING ACPI MACHINE LANGUAGE TABLES" filed May 28, 2003, the disclosure of which is hereby incorporated herein by reference.

The SAL_ABI adapter is initialized next in operational block 923. This program layer calls into the core firmware to obtain the descriptions of memory and I/O resources that will be provided to the operating system. Various tables are built, including a map of memory that will be given to the EFI adapter, a map of the PCI devices that are present which is used to hold synchronization locks for subsequent calls to SAL PCI_CONFIG_READ and PCI_CONFIG_WRITE and the SAL Extensions Interface Table (ESIT) which holds entry points of OEM-extensions to SAL.

The EFI adapter is then called in operational block 924 from the SAL_ABI adapter (and the BSP does not return) and EFI is initialized. It receives a hand-off descriptor structure from the SAL_ABI adapter from which it constructs the architected System Table that is provided to the OS. The EFI Boot Manager is invoked and an opportunity to interact with it is provided to the user on the system firmware console.

Finally, in operational block 925 the EFI shell is entered if the system is not set to auto boot or if it is set to auto boot, the boot manager uses the boot variables to select the boot device and it loads the EFI program which is usually an OS loader.

Operational block 931 represents the launch into the EFI program at which time the system software begins controlling the machine. Meanwhile, the Application Processors are idling in the OS_RENDEZVOUS wait of operational block 917. This handoff represents the end of responsibility of firmware control of the Boot Startup Processor (BSP) which will usually make procedure calls into EFI, SAL and PAL to collect information about the hardware and continue system initialization.

Block 926 indicates operations that all CPUs perform. Block 927 indicates operations only Cell Slave CPUs perform. Operational block 928 indicates the steps that only the CPUs whose role is Cell Master (one per cell in the hard partition) perform. Block 929 illustrates the sequences that only one of the Cell Masters in the entire hard partition performs—this is the CPU whose role is 'Hard Partition Monarch' and is also the CPU that becomes the architected BSP CPU which loads and launches the OS loader. Block 930 indicates the activities that only the Application Processors perform. These processors are the Cell Slaves and the Cell Masters which did not become the Partition Monarch. The principal activity is waiting to be launched by the OS when the wakeup interrupt is received.

FIGS. 1A-10B show an example operational flow diagram for initial bootstrap of a cellular IPF computer system that supports the fPars extensions of soft partitioning in accordance with one embodiment. This diagram represents three different boot sequences: cold boot from power on of a) a system configured to boot a single OS instance (1 nPar), b) a system configured to boot one or more operating system instances within soft partitions configured inside one hard partition (N fPars), and c) the latter system wherein one or more soft partitions may be reset and/or reconfigured and booted without rebooting the hard partition from cold-reset. Thus, this flow diagram represents a system that is a complete superset of the previous system described in FIG. 9. As with the foregoing operational diagram of FIG. 9, FIGS. 10A-10B can be simplified (by removing the per-cell sub-sequences) to accurately model embodiments applied to non-cellular IPF computer systems. The sequel will detail each of the operational blocks in FIGS. 10A and 10B so that one skilled in the art could reproduce an embodiment of the invention. Many of the operational blocks are naturally identical to operations in FIG. 9, others are slightly modified variants of their counterparts in FIG. 9, and a few operations are newly introduced in FIGS. 10A-10B.

Operational block 1001 represents the power-on reset and execution of the Intel Processor Abstraction Layer (PAL) Firmware (labeled 404 in FIG. 4) whose innermost workings are proprietary. Exiting PAL and entering operational block 1002 is the first time the System Abstraction Layer (SAL) firmware is executed following a reset. SAL is the architectural name for all of the non-processor firmware represented in FIGS. 10A and 10B in operational blocks 1002-1045.

Each cell (of a multi-cell configuration) contains a copy of the same firmware and begins its initialization without knowledge (yet) of or the ability to communicate with the other cells that will join it in forming what is referred to as a "hard partition", or "nPar". Operational block 1021 (labeled ALL CPU ACTIVITIES) represents a sequence of operations that every CPU exiting PAL and entering SAL performs.

Operational block 1002 represents the architected SAL to PAL handoff defined by the Intel IPF architecture specification previously cited. Operational block 1003 represents the firmware that performs the health-check (status from PAL) and multi-CPU rendezvous to select the single processor (called here Cell Master) that will continue with cell initialization shown in block 1022 ("CELL MASTER ACTIVITIES"). Unhealthy processors (those that fail PAL self tests) are prevented from continuing execution beyond this block. It will be readily seen by one skilled in the art that unhealthy processors will need to be held in a state that does not proceed through to subsequent steps. Many embodiments of hardware and/or firmware exist in the art for effectively achieving such a function and thus are not described further herein.

Healthy processors continue processing after the cell master selection by entering operational block 1004 where each processor calls the PAL service to initialize its own internal cache memory.

Following the cache initialization of block 1004, each CPU executes a decision (1005) and either enters the operational block labeled CELL SLAVE ACTIVITIES (1024) or the block labeled CELL MASTER ACTIVITIES (1022). If the CPU is a slave it begins monitoring (1006) for orders from the master to be executed in block 1007. Examples of orders include coordinated Self Test operations as well as commands to continue on to participate in the role selection process in operational block 1015. Since it is possible for the Cell Master CPU to fail during later self-test operations, the Slaves also monitor the forward/progress and health of the Master. Upon detecting a master failure (by observing lack of forward progress through the processing steps 1008-1014), a cell slave will promote itself to master and perform deconfiguration of the master, log the error event and then reset the server. Upon reboot, a different, presumably healthy master will be selected and boot will proceed further.

The partition role selection operation (1015) was not present in FIG. 9; however, this omission is not significant. Its presence in this sequence simply introduces a slightly more symmetric treatment of healthy CPUs, allowing any processor, including those chosen as cell slaves to be selected as the single processor that performs the role of partition master. This step could be included in FIG. 9 at the appropriate point (after block 915 and before block 916). The benefit of introducing more symmetry is that doing so makes it simpler for automated testing of the myriad of code paths and configuration permutations. This is a well-known technique in the field and not relevant to this phase of the sequence.

Since each Cell in a multi-cell server contains a Cell Master, the operational blocks 1008-1014 may be performed in parallel by each cell according to its own configured hardware. This parallelism is very desirable in large servers which have large I/O hardware configurations because the discovery and initialization of I/O hardware components is usually very time-consuming. Also, the configuration and initialization of large physical memory arrays also benefit from such per-cell parallelism during boot.

Up through decision point (1005), the CPUs are executing without a stack using only registers and ROM. Because cellular memory systems are quite complex to configure, it is desirable to create the firmware that performs this work in a high level language, such as C. C is a procedural language requiring a large stack and heap. This means the firmware cannot use the memory to initialize the memory. Therefore, it is typical of such systems to include a small amount, perhaps 1 megabyte, of special memory that is trivial to initialize. Such memory is often low-performance and not necessarily coherent. In this example embodiment, such memory is called SRAM (Static RAM). Therefore, the first critical task for the cell master is to initialize the SRAM and C-runtime (CRT) environment so the rest of the processing steps (including the slaves) can be written in the high-level language that requires a stack, and software resources such as a heap and interrupt tables may be used. This work is represented by operational block 1008. After the stacks and their backing store (an IPF requirement) are created by the master for each CPU in its cell, orders are sent to the monitoring (1006) slaves to command them (1007) to initialize their internal registers to use the new stacks and interrupt tables. Subsequently slaves can be commanded to execute orders also written in high level language.

The cell master then initializes data structures used for orchestrating the careful sequencing of the rest of the cell boot strap, as shown in block 1009. In block 1010, a decision point enables an internal debugging module if a Non-Volatile RAM (NVRAM) configuration option had been previously set to true. If this variable is true operational block 1011 is performed. This debugger contains a simple UART and/or LAN device driver for interactive or remote debugging. If the variable is false, the Cell Master skips block 1011 and continues with its per-cell initialization in block 1012.

Operational block 1012 creates the root of a tree-based (hierarchical) database employed by the Banyan firmware architecture and initializes the minimal component/framework data structures to allow growing branches and nodes of the database. Operational block 1013 represents the discovery and initialization of various hardware elements within (e.g., memory, IO) and connected to (e.g., IO) the cell. As elements are discovered and initialized the tree database 'grows' new branches and nodes.

Following step 1013, which is occurring in parallel on each cell of the intended partition, the cells communicate with each other and determine which cells are actually booting and healthy. The intended set of cells is described in an NVRAM database that is stored within each Cell prior to its release from reset by the power controller subsystem. Because of the introduction (relative to FIG. 9) of the operational block PARTITION ROLE SELECTION (1015), the step RENDEZVOUS CELLS (1014) is slightly different than operation 914 in FIG. 9. In operational block 1014, the cell masters issue orders to their slaves (within the same cell) to begin participating in the partition wide (all healthy CPUs in the partition) process of partition monarch selection, whereby only one CPU out of all of the cell slaves and other cell masters (in multi-cell partitions) participate symmetrically in monarch selection. As soon as all of the master's slaves are thus commanded, the cell master exits block 1014 and enters the selection process in 1015. Selection can be through any number of algorithms including pre-selection according to a non-volatile policy variable or hardware circuit.

Decision point 1016 represents the operation of the choice created in 1015. The CPU that is selected as the Partition Monarch continues to initialize the hard partition in the block of operations labeled PARTITION MONARCH ACTIVITIES (1023). All others of the Cell Master processors and Cell Slave processors enter Partition Slave activities 1025 to enter a barrier synchronization labeled COLD BOOT BARRIER SYNC (1017) and remain idle until released to participate in further sequencing. Though not illustrated, slaves could also be commanded (by the monarch) to execute orders that assist in the partition wide initialization using mechanisms similar to those in block 1024. Meanwhile, the Partition Monarch continues the monarch's part of the COLD BOOT ACTIVITIES (1023). These activities are performed only one time from cold boot (power on reset) and are used to prepare the server hardware and firmware infrastructure that allow instantiating the operating environment for the operating system (nPar) or systems (fPars).

The first step the partition monarch performs is to initialize the hardware within each cell to 'connect' the cells into a single, large, Symmetric Multi-Processing (SMP) server.

This is represented by operational block 1018. Having done this, it is then possible to re-initialize the memory controllers within each cell to interleave memory across multiple cells. It is then also possible to graft the roots of each cell local device tree into a single rooted-tree called the partition tree. Also, partition-level firmware database structures such as the NVRAM manager for EFI non-volatile variables are initialized and made ready during the Grow Partition Tree (1019) operation. An operation that is different from block 919 of FIG. 9 occurs here. This is the initialization of the soft-partition database manager component within the core firmware. This component represented by element 61 in FIGS. 6 and 703 of FIG. 7, is responsible for holding the data that represents the hardware resource assignments (CPUs, I/O and Memory devices) for each booting OS instance.

Figure 10A:
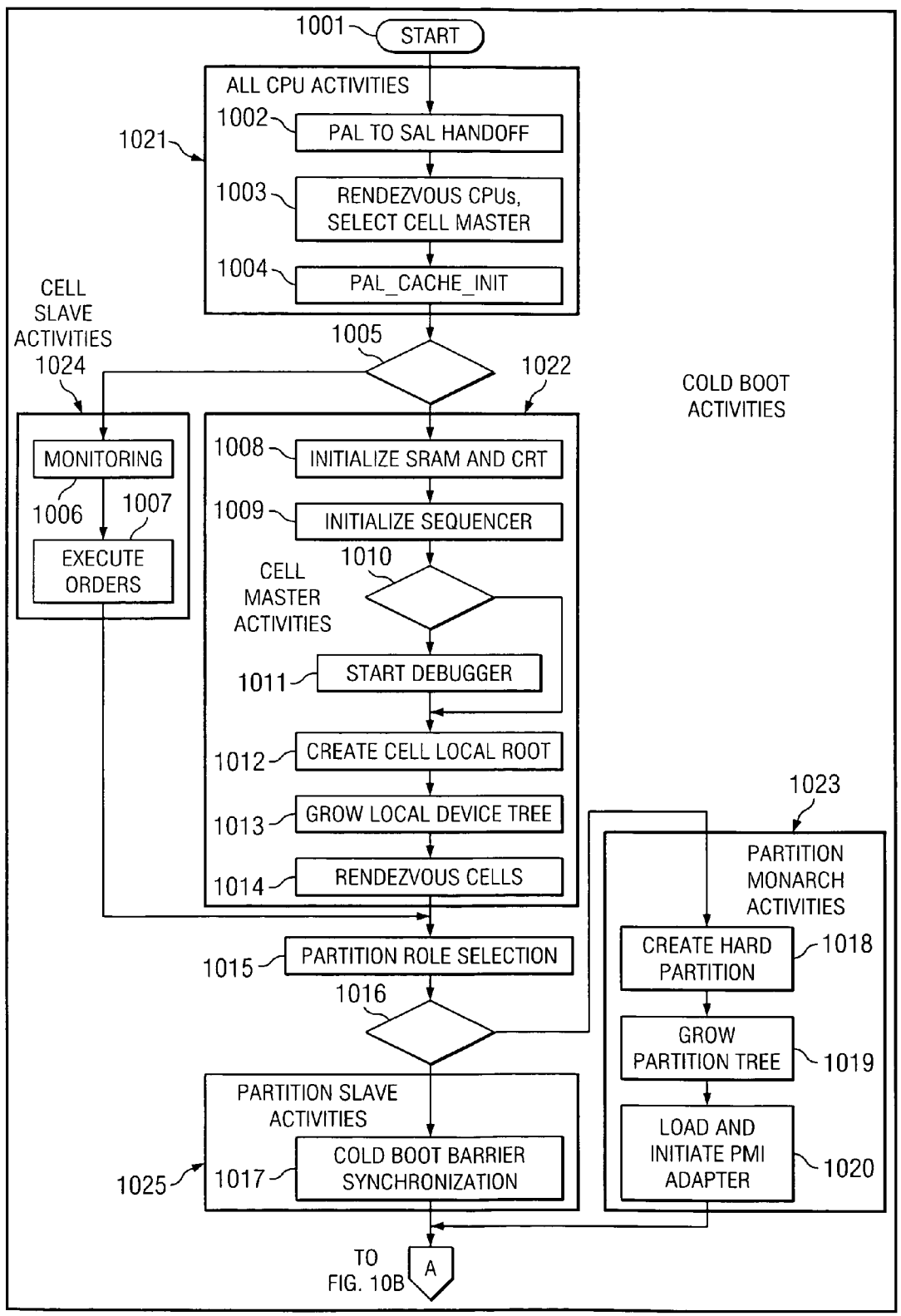

Up to this point, the operations of FIG. 10A are very similar to those of FIG. 9. However, in operational block 1020 of FIG. 10A, the partition monarch loads and initializes the Platform Management Interrupt Agent (602, 512) which is to exist as a single instance for the hard partition, whether or not the system subsequently boots a single instance OS (nPar OS) or multiple soft-partition-enabled OS (fears) instances. The primary reason that one copy of PMI is initialized is that the architectural restriction of IPF processor PAL firmware states that implementations of the IPF instruction set are required to support only one registration of the PMI handler. This means that only one address can be given to each IPF CPU for every power-cycle reset. Since the processors running in soft-partition instances will undergo possibly many soft-partition (emulated) resets to reboot OS instances, but not undergo any cold reset that re-enters the PALE_RESET vector, it is necessary to ensure that every CPU in the hard partition register its PMI handler one and only one time. In the previous FIG. 9, the nPar never performs soft resets, and this requirement is met automatically by the fact that there is one BSP for the nPar so that this registration may be done later. However, in the soft partition environment, there are many BSPs each of which perform the remaining initialization steps and may do so several times before the hard partition is 'cold booted' again and the process begins again at 1001.

The operational flows of partition slaves and the partition monarch exit FIG. 10A at label "A". This completes the activities of CPUs that occur once and only once for every reboot. FIG. 10B illustrates the activities that CPUs in the hard partition (nPar) perform once, but in the soft partition operating mode, will perform again and again, each time a soft partition is created and launched, including of course, the very first time out of cold reset. At the end of the processing of FIG. 10A, main memory, and I/O hardware in the hard partition, along with all of the CPUs are now ready to be used to instantiate the standard IPF operating environment for IPF operating system software. However, this step is where some steps of embodiments that support multiple, separate operating environments within the same single IPF server occur. The collection of these operations for one example embodiment is found in FIG. 10B and labled FPARS SEQUENCER ACTIVITIES (1042).

We begin discussing the operational flow of processors exiting the steps in FIG. 10A at label "A". These flows represent the operation for cold boot activity of CPUs that is performed only once for each entry to the sequence at the start point 1001 (a cold or power-on reset of the server). The flow of processors in the soft-partition operating mode begins at step 1038 which is discussed below.

New (relative to FIG. 9) operational block 1027 performs the boot role selection process whereby the architecturally defined role of Application Processor (0 or many) and Boot Startup Processor (one) is determined. Every IPF server instance (one in the nPar mode, and one or more in the fPar mode) has a single private copy of the EFI firmware code to execute the architected initialization sequence of loading and launching the operating environment on a single processor called the Boot Startup Processor (BSP). The NVRAM EFI variables that specify assignment (mapping of CPU to fPar instance) are used in this block when operating in fPars mode, and are ignored when operating in nPars mode. In nPars mode, one processor is selected as BSP, and all other processors (if present) are selected to be Application Processors (APs). In fPars mode, a third role is possible: that of unassigned processor. Such processors are not assigned to boot and are held in a Draft Pool state (1041) from which they may exit to become drafted to boot within a subsequently created or activated fPar by participating in the soft reset process (1038).

Upon exit from block 1027 each processor knows its own role and performs a decision at 1028 to determine the block of code to enter. APs enter the BOOT BARRIER SYNCHRONIZATION block (1040) where they wait to be commanded by their BSP to enter the architected OS RENDEZVOUS WAIT state (1043). BSPs continue to execute the steps that assign memory and I/O hardware to the booting instance beginning with IO in operational block 1029. And, as mentioned above, processors whose role is unassigned because they are specifically unassigned, or are assigned to an fPar whose state is disabled, which means it will not boot until directed to do so through a soft reset process. These processors are functionally unassigned.

Operational block 1029 is functionally bi-modal. In nPars mode, all of the I/O hardware is assigned to the booting instance, but the hardware is known to have been initialized earlier during the processing by cell masters as they grew their local device tree (1012). Therefore, the I/O is assigned but not initialized. However, in fPars mode, the IO will be re-initialized if the sequence was entered at the SOFT RESET point (1038) because the IO hardware will have stale states arising from operating within a software environment inside an OS. The hardware is to be placed in a known good state so that the EFI boot drivers will be able to correctly function.

Next, the BSP(s) will enter operational block 1030, which in the nPars operating mode, all memory is assigned to the single OS instance in a way that is identical to that employed in the previously seen FIG. 9. In the soft-partition (fPars) mode, non-intersecting regions of physical memory within the hard partition will have been assigned to one or more fPars or held in the unassigned state. In this operation these descriptions are made available to the BSP through internal interfaces such as GetMyHeap( ), GetMyStack( ), GetMyInstanceRAM( ) that are contextual (depending on the ID of the calling CPU). The BSP can use these interfaces to create its operating environment, with full assurance that only resources belonging to it will be described, thereby obviating the need to do any communication with other BSP processors that may be booting or operating within sibling soft-partition instances.

Now that CPUs, I/O and Memory hardware is assigned to the instance being booted by the BSP, it is free to begin the instantition of the architecturally required OS-Firmware interface. But just before it begins this work, the BSP uses the MyCpus( ) function provided by the fPars database (701) to release each of its (possibly none) Application Processors from their BOOT BARRIER SYNCHRONIZATION operation (1040) so they may begin waiting for the OS to wake them up (1043). A preferred embodiment provides a rendezvous spin loop that is stored within memory belonging to the fPar itself. This memory is available to the BSP because of the assignment in step 1030. An alternate embodiment employs the same memory (one copy of the spin loop) for all APs of all soft partitions. Typical mechanisms for commanding APs to exit step 1040 include interrupts, shared memory message passing, polling a memory location for a sentinel value, and special hardware registers or mailbox mechanisms. The mechanism for release is not intellectually significant and embodiments may employ any suitable mechanism familiar to those skilled in the art.

At this point during the sequence, FIG. 10B begins to resemble the BSP activities (929) of FIG. 9. Only the steps related to the PMI agent are omitted because the PMI agent is already initialized for the entire hard partition (1020). So, the BSP of the nPar (and every enabled and validly configured fPar) begins executing the BSP ACTIVITIES (1044).

In operational block 1033 memory is selected for the OS interface adapters required by every IPF instance (603, 604, 605) and PAL (606). The adapters are loaded into their memory. The memory for the ACPI tables is selected by calling into the ACPI Agent (509, 603) during operational block 1034. In order to support fPars capability of device migration, the ACPI Agent behavior in fPars mode generates what is referred to herein as the spanning namespace instead of a segmented view of hardware. This means all of the hardware is described in the ACPI tables but it is described in a way that the soft-partition-enabled OS knows which hardware is usable and which is not usable. Hardware that is not usable belongs to some other sibling fPar or is unassigned. By placing descriptions of unassigned, but physically present, hardware in the ACPI namespace seen by each OS instance, the use of standard ACPI hotplug interfaces (specifically the Notify( ) operator, the _EJ0 and _STA methods, and the extension methods FPN and SFPN) can be employed in a novel way to perform online (dynamic) reconfiguration of resources. The online reconfiguration of resources avoids going through a shutdown and reboot of an operating environment and is thus superior to static configuration. Both models are included in a single design in certain embodiments. The inclusion of soft partitioning features in the ACPI tables generated by the ACPI Agent also maintains the ability to grow or shrink the namespace dynamically. For example, when a cell that is not present at cold boot time is subsequently added to the hard partition, the namespace must grow to describe the added hardware. Alternatively, when a cell is removed from the hard partition, its description within the ACPI namespace must be pruned (removed).

The SAL_ABI adapter is initialized next in operational block 1035. This program layer calls into the core firmware to obtain the descriptions of memory and I/O resources that will be provided to the operating system. This example embodiment uses the previously mentioned fPars database and functions like MyInstanceRAM( ) to satisfy these requests such that the calling CPU (in nPars mode or fPars mode) obtains a segmented (non-intersecting) view of the resources. Various tables are built, including a map of memory that will be given to the EFI adapter, a map of the PCI devices that are present which is used to hold synchronization locks for subsequent calls to SAL PCI_CONFIG_READ and PCI_CONFIG_WRITE, and the SAL Extensions Interface Table (ESIT) which holds entry points of OEM-extensions to SAL.

The EFI adapter is then called in operational block 1036 from the SAL_ABI adapter (and the BSP does not return) and EFI is initialized. It receives a hand-off descriptor structure from the SAL_ABI adapter from which it constructs the architected System Table that is provided to the OS. If the BSP is launching an nPar, the instance is given all available memory as with FIG. 9. But, again, in fPars mode the memory described to the OS through these architected interfaces provides the segmented view of memory (except for the new memory type that supports shared memory between soft partitions). The EFI Boot Manager is invoked and an opportunity to interact with it is provided to the user on the system firmware console.

In operational block 1037 the EFI shell is entered if the system is not set to auto boot or if it is set to auto boot, the boot manager uses the boot variables to select the boot device and it loads the EFI program which is usually an OS loader.

Operational block 1045 represents the launch into the EFI program at which time the system software begins controlling the machine. Meanwhile, the Application Processors are idling in the OS_RENDEZVOUS wait of operational block 1043. This handoff represents the end of responsibility of firmware control of the Boot Startup Processor (BSP) which will usually make procedure calls into EFI, SAL and PAL to collect information about the hardware and continue system initialization.

Finally, in the fPars operating mode, any booted OS that shuts down using the architected EFI ResetSystem( ) service will actually be shutting down only its instance. The EFI adapter (510, 604) is modified in this embodiment so that in fPars mode it causes the processors to begin executing in the fPars Sequencer Activities by entering operational entry (1038). The activity of process 1038 is a sequence of instructions and PAL procedures invoked by those instructions which results in making the CPU "ready to begin booting", without having gone through the power-on cold (startup) code of the PAL. We think of this as "scrubbing" the CPU. Examples of activities during scrubbing are: set the CPU execution to physical mode (disable virtual address translation), invalidate the TLB, disable interrupts, drain all pending interrupts, and invalidate the processor caches), and other steps that depend upon the CPU instruction set architecture.

What is claimed is:

1. A method, comprising:
   partitioning a computer system into a plurality of soft partitions each of which runs a respective operating system;
   instantiating a separate respective firmware instance for each of said plurality of soft partitions, wherein each of said firmware instances provides a respective pre-defined firmware interface for the operating system of its soft partition; and
   in accordance with shared logic that interfaces with each operating system through its respective pre-defined firmware instance,
      subdividing physical memory resources of the computer system into non-intersecting regions of physical memory that appear to the operating systems as individual memory devices in a spanning namespace,
      assigning to each of the plurality of soft partitions a respective set of hardware resources of the computer system including a respective set of the non-intersecting regions of physical memory and a respective subset of the spanning namespace,
      maintaining a configuration database comprising respective specifications of the sets of hardware resources assigned to the plurality of soft partitions, and
      providing the respective specification of the set of assigned hardware resources to each of the operating systems through its respective pre-defined firmware interface.

2. The method of claim 1 wherein the pre-defined firmware interface comprises a standard firmware interface.

3. The method of claim 2 wherein the standard firmware interface comprises at least one selected from the group consisting of: ACPI interface, EFI interface, SAL interface, and PAL interface.

4. The method of claim 2 wherein the standard firmware interface comprises an extension mechanism to at least one selected from the group consisting of: ACPI interface, EFI interface, SAL interface, and PAL interface.

5. The method of claim 4 wherein the extension mechanism comprises at least one selected from the group consisting of: an OEM Runtime EFI Protocol extension to the EFI interface, and an OEM Extensible SAL Interface Table to the SAL interface.

6. The method of claim 1 wherein said partitioning comprises: assigning resources of the computer system to each of the plurality of soft partitions.

7. The method of claim 6 wherein said assigning comprises: defining in a configuration database, for each of the plurality of soft partitions, the resources that are assigned to the soft partition.

8. The method of claim 7 further comprising: each of said firmware instances accessing said configuration database.

9. The method of claim 1 further comprising: migrating at least one resource from a first one of the plurality of soft partitions to a second one of the plurality of soft partitions.

10. The method of claim 9 wherein said migrating comprises:
updating a configuration database to specify that the at least one resource is assigned to the second partition,
using firmware interface of the first partition for removing the at least one resource from the first partition, and
using firmware interface of the second partition for adding the at least one resource to the second partition.

11. The method of claim 9 wherein said migrating comprises: dynamically migrating said at least one resource from a first one of the plurality of soft partitions to a second one of the plurality of soft partitions without shutting down the operating systems of the first and second soft partitions.

12. The method of claim 10 wherein said using the firmware interface of the first partition for removing the at least one resource from the first partition comprises using hotplug instructions supported by the firmware interface for removing the at least one resource.

13. The method of claim 10 wherein said using the firmware interface of the second partition for adding the at least one resource to the second partition comprises using hotplug instructions supported by the firmware interface for adding the at least one resource.

14. The method of claim 1, comprising:
running an instance of a first type of operating system on a first one of the plurality of soft partitions; and
running an instance of a second type of operating system on a second one of the plurality of soft partitions, wherein the second type of operating system is different from the first type of operating system.

15. The method of claim 14 wherein the first type of operating system and the second type of operating system are each selected from the group consisting of: LINUX, WINDOWS, Open VMS, and IPF HP-UX.

16. The method of claim 14 wherein the first type of operating system and the second type of operating system are each standard operating systems.

17. The method of claim 14 further comprising: providing a firmware instance for each of the first and second ones of the plurality of soft partitions, said firmware instance enabling a standard firmware interface for its soft partition.

18. The method of claim 14 further comprising: assigning certain resources of the computer system to the first one of the plurality of soft partitions; and assigning certain resources of the computer system to the second one of the plurality of soft partitions.

19. The method of claim 18 further comprising:
running a first firmware instance for the first one of the plurality of soft partitions, said first firmware instance enabling the first operating system to interact with the resources assigned to the first one of the plurality of soft partitions using a standard firmware interface; and
running a second firmware instance for the second one of the plurality of soft partitions, said second firmware instance enabling the second operating system to interact with the resources assigned to the second one of the plurality of soft partitions using a standard firmware interface.

20. A computer system comprising:
a plurality of soft partitions each running a respective operating system;
a separate respective firmware instance for each of said plurality of soft partitions, each of said firmware instances providing a respective pre-defined firmware interface for the operating system of its soft partition; and
a processor that executes shared logic interfacing with each operating system through its respective pre-defined firmware instance to perform operations comprising,
subdividing physical memory resources of the computer system into non-intersecting regions of physical memory that appear to the operating systems as individual memory devices in a spanning namespace,
assigning to each of the plurality of soft partitions a respective set of hardware resources of the computer system including a respective set of the non-intersecting regions of physical memory and a respective subset of the spanning namespace,
maintaining a configuration database comprising respective specifications of the sets of hardware resources assigned to the plurality of soft partitions, and
providing the respective specification of the set of assigned hardware resources to each of the operating systems through its respective pre-defined firmware interface.

21. The computer system of claim 20 further comprising: for each soft partition, at least one processor.

22. The computer system of claim 20 wherein said standard firmware interface comprising: ACPI interface, EFI interface, SAL interface, and PAL interface.

23. The computer system of claim 20 further comprising: a configuration database specifying resources assigned to each of the plurality of soft partitions.

24. The computer system of claim 23 wherein the resources are resources of a hard partition.

25. The computer system of claim 23 wherein said configuration database is accessible by each of said firmware instances.

26. A computer system, comprising:
means for defining a plurality of soft partitions each running a respective operating system; and
means for providing a separate respective firmware instance for each of said plurality of soft partitions, each of said firmware instances providing a respective pre-defined firmware interface for the operating system of its soft partition; and
means for executing shared logic interfacing with each operating system through its respective pre-defined firmware instance to perform operations comprising,
subdividing physical memory resources of the computer system into non-intersecting regions of physical memory that appear to the operating systems as individual memory devices in a spanning namespace,
assigning to each of the plurality of soft partitions a respective set of hardware resources of the computer system including a respective set of the non-intersecting regions of physical memory and a respective subset of the spanning namespace,
maintaining a configuration database comprising respective specifications of the sets of hardware resources assigned to the plurality of soft partitions, and
providing the respective specification of the set of assigned hardware resources to each of the operating systems through its respective pre-defined firmware interface.

27. The computer system of claim 26 wherein said pre-defined firmware interface is standard firmware interface.

28. The computer system of claim 27 wherein said firmware interface comprises: ACPI interface, EFI interface, SAL interface, and PAL interface.

29. The computer system of claim 26 wherein the defining means comprises a configuration database specifying resources assigned to each of the plurality of soft partitions, and wherein each of the firmware instances are capable of communicatively accessing said configuration database.

* * * * *